United States Patent
Hsiao

(10) Patent No.: US 11,945,185 B2
(45) Date of Patent: *Apr. 2, 2024

(54) SHOE STRUCTURE AND MANUFACTURING METHOD THEREOF

(71) Applicant: Sheng Long Material Tech. Ltd. (WS), Apia (WS)

(72) Inventor: Chin-Hsun Hsiao, Taipei (TW)

( * ) Notice: Subject to any disclaimer, the term of this patent is extended or adjusted under 35 U.S.C. 154(b) by 1224 days.

This patent is subject to a terminal disclaimer.

(21) Appl. No.: 16/555,215

(22) Filed: Aug. 29, 2019

(65) Prior Publication Data
US 2020/0070457 A1    Mar. 5, 2020

(30) Foreign Application Priority Data

Aug. 31, 2018    (TW) ................................ 107130726

(51) Int. Cl.
| | | |
|---|---|---|
| *B29D 35/14* | (2010.01) | |
| *A43B 7/12* | (2006.01) | |
| *A43B 23/02* | (2006.01) | |
| *B29C 35/08* | (2006.01) | |
| *B29D 35/00* | (2010.01) | |
| *B29D 35/12* | (2010.01) | |
| *B29K 75/00* | (2006.01) | |
| *B29L 31/50* | (2006.01) | |
| *B32B 27/06* | (2006.01) | |

(52) U.S. Cl.
CPC ....... *B29D 35/148* (2013.01); *B29D 35/0018* (2013.01); *B29D 35/126* (2013.01); *A43B 7/12* (2013.01); *A43B 23/0235* (2013.01); *B29C 2035/0855* (2013.01); *B29K 2075/02* (2013.01); *B29L 2031/505* (2013.01); *B32B 27/065* (2013.01); *B32B 2437/02* (2013.01)

(58) Field of Classification Search
CPC ...... A43B 7/12; B29D 35/067; B29D 35/126; B29L 2031/505; B32B 2437/02; B32B 5/32

See application file for complete search history.

(56) References Cited

U.S. PATENT DOCUMENTS

| | | | |
|---|---|---|---|
| 5,289,644 A | 3/1994 | Driskill et al. | |
| 5,885,500 A * | 3/1999 | Tawney | ............... B29D 35/126 264/154 |
| 9,968,157 B2 | 5/2018 | Wardlaw et al. | |

(Continued)

FOREIGN PATENT DOCUMENTS

| | | |
|---|---|---|
| CN | 2542097 | 4/2003 |
| CN | 1988817 A | 6/2007 |

(Continued)

*Primary Examiner* — Francisco W Tschen
*Assistant Examiner* — Elisa H Vera
(74) *Attorney, Agent, or Firm* — INNOVATION CAPITAL LAW GROUP, LLP; Vic Lin

(57) ABSTRACT

A method of manufacturing a shoe structure includes: a setting step of setting an upper on a shoe last, and distributing a foam matrix material comprising a plurality of semi-foamed granules of thermoplastic polyurethanes (TPU) along a bottom of the shoe last to position the foam matrix material between the shoe last and the upper, and a foaming step of heating the shoe last with the upper and the foam matrix material thereon by microwave, so that the semi-foamed granules are foamed to form an insole bonded to the upper, and the upper is shaped along a contour of the shoe last after cooling and removing the shoe last.

11 Claims, 21 Drawing Sheets

(56) References Cited

U.S. PATENT DOCUMENTS

| | | | |
|---|---|---|---|
| 11,284,672 B2 * | 3/2022 | Hsiao | A43B 23/0235 |
| 2003/0145495 A1 | 8/2003 | Green | |
| 2005/0230026 A1 | 10/2005 | Kramer | |
| 2010/0115792 A1 | 5/2010 | Muller | |
| 2011/0179677 A1 | 7/2011 | Jessiman et al. | |
| 2013/0291409 A1 | 11/2013 | Reinhardt et al. | |
| 2014/0033452 A1 | 2/2014 | Mueller | |
| 2014/0366403 A1 | 12/2014 | Reinhardt et al. | |
| 2014/0366404 A1 | 12/2014 | Reinhardt et al. | |
| 2014/0366405 A1 | 12/2014 | Reinhardt et al. | |
| 2015/0230541 A1 | 8/2015 | Bacino et al. | |
| 2016/0128426 A1 | 5/2016 | Reinhardt et al. | |
| 2017/0073490 A1 * | 3/2017 | Huang | C08J 9/16 |
| 2017/0306539 A1 | 10/2017 | Gladish et al. | |
| 2018/0035755 A1 | 2/2018 | Reinhardt et al. | |
| 2018/0079185 A1 * | 3/2018 | Baychar | A43B 5/0405 |
| 2018/0125159 A1 | 5/2018 | Adami et al. | |

FOREIGN PATENT DOCUMENTS

| | | | |
|---|---|---|---|
| CN | 101677646 A | 3/2010 | |
| CN | 106235518 A | 12/2016 | |
| CN | 104227904 B | 12/2017 | |
| CN | 103371564 B | 6/2018 | |
| EP | 3181620 A1 | 6/2017 | |
| TW | 201736093 A | 10/2017 | |
| TW | 201736423 A | 10/2017 | |
| TW | 201736450 A | 10/2017 | |
| TW | I607125 B | 12/2017 | |

* cited by examiner

SHOE STRUCTURE AND MANUFACTURING METHOD THEREOF

BACKGROUND OF THE INVENTION

1. Field of the Invention

The invention relates to a shoe structure and a manufacturing method thereof. Particularly, the invention relates to a shoe structure with an insole formed by foaming through microwave heating and a manufacturing method thereof

2. Description of the Prior Art

Plastic/rubber molded bodies have been widely used in various fields in the world to manufacture various utensils or products such as toys, shoes, auto parts, electronic parts, etc. According to the above, it is common to use injection molding to heat and melt plastic at a high temperature and inject it into a mold to form various plastic/rubber molded bodies. However, in such a process, it is necessary to use an injection molding machine and a relatively high-temperature resistant mold, hence the configurations required and costs of the overall procedure are relatively high. Therefore, it is necessary to develop plastic/rubber molded bodies of various structures and the methods for preparing such plastic/rubber molded bodies, and the corresponding detailed processes for various designs or products.

As described above, in order to provide plastic/rubber molded bodies of other structures, Taiwan Patent Publication No. TW 201736423A proposes a foamable composition which can be used for foaming, a foamed thermoplastic polyurethane (TPU) granule which is formed by foaming and granulation, and the microwave molded bodies produced by the same and corresponding manufacturing methods thereof; Taiwan Patent Publication No. TW 201736450A proposes a method of forming a microwave molded body on the surface portion of an object and a microwave molded body thereof; and Taiwan Patent Publication No. TW 201736093A proposes a method corresponding to formation of a microwave molded shoe and a microwave molded shoe produced therefrom. The above-mentioned Taiwan Patent Publications disclose several foamed granular materials especially designed to adjust the granule color or the granule hardness during granulation, and discloses fittings or objects that can be bonded with the foamed granular material by an adhesive layer or fused with the foamed granular material by microwave heating. However, the invention further proposes materials that can be applied depending on the nature of microwave heating and various configurations of foaming, in order to further provide a method and a finished product thereof for preparing various detailed structures and configurations of microwave molded bodies.

SUMMARY OF THE INVENTION

It is an object of the invention to provide a method of manufacturing a shoe structure. The method includes: setting an upper on a shoe last, distributing a foam matrix material including a plurality of first semi-foamed granules of thermoplastic polyurethanes (TPU) along a bottom of the shoe last to position the foam matrix material between the shoe last and the upper, and heating the shoe last with the upper and the foam matrix material thereon by microwave, so that the first semi-foamed granules are foamed to form an insole bonded to the upper, and the upper is shaped along a contour of the shoe last after cooling.

In another embodiment, the invention provides a shoe structure manufactured by the method mentioned above. The shoe structure includes an upper and an insole. The insole is formed by foaming the TPU to have a foaming structure with a plurality of granules pressed against each other and welded to each other by surfaces thereof, and the insole is integrally bonded to the upper.

According to another embodiment of the invention, a shoe structure is provided. The shoe structure includes an upper and one or more foam molded bodies. The one or more molded foams are formed by foaming a plurality of semi-foamed granules of thermoplastic polyurethane (TPU). The foam molded body has a foaming structure with a plurality of granules pressed against each other and welded to each other by surfaces thereof, wherein the one or more foam molded bodies are integrally bonded to the upper.

According to the method of manufacturing shoe structure and the shoe structure thereof provided by the embodiments of the invention, an insole made of molded foam that binds and fits with the upper can be provided without other process. As a result, delicacy and applicability of molded foam can be increased According to the embodiments of the invention, the method of manufacturing a shoe structure and the shoe structure manufactured thereon can be provided with a foam molded body, which serves as an insole and is integrally-formed with the upper. Thereby, the finished product can have a more complete integrated appearance, thus improving the fineness and applicability of the foam molded body.

DETAILED DESCRIPTION OF THE PREFERRED EMBODIMENT

Various embodiments will be described hereinafter, and for one skilled in the art having ordinary knowledge in the description with reference to the drawings, the spirit and principle of the invention should be readily understood. However, although some specific embodiments will be specified in this article, these embodiments are to be considered as illustrative and not restrictive or limiting. Therefore, for those who have general knowledge in the technical field of their own, without departing from the spirit and principles of the invention, the various changes and modifications to the invention should be obvious and easily achievable.

Figure 1:
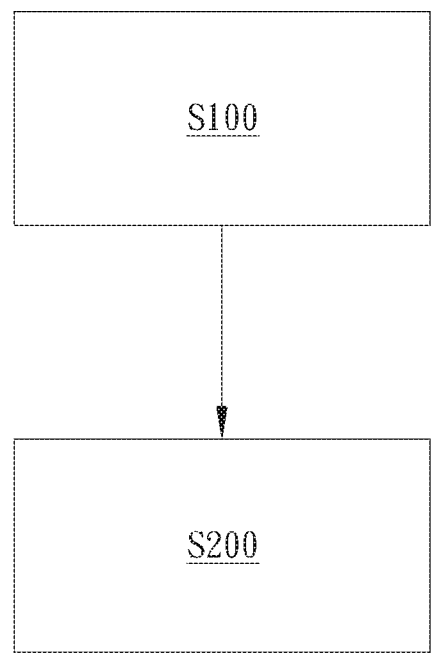
FIG. 1 illustrates a flow chart of a method of manufacturing a shoe structure in accordance with an embodiment of the invention.
Figure 2A:
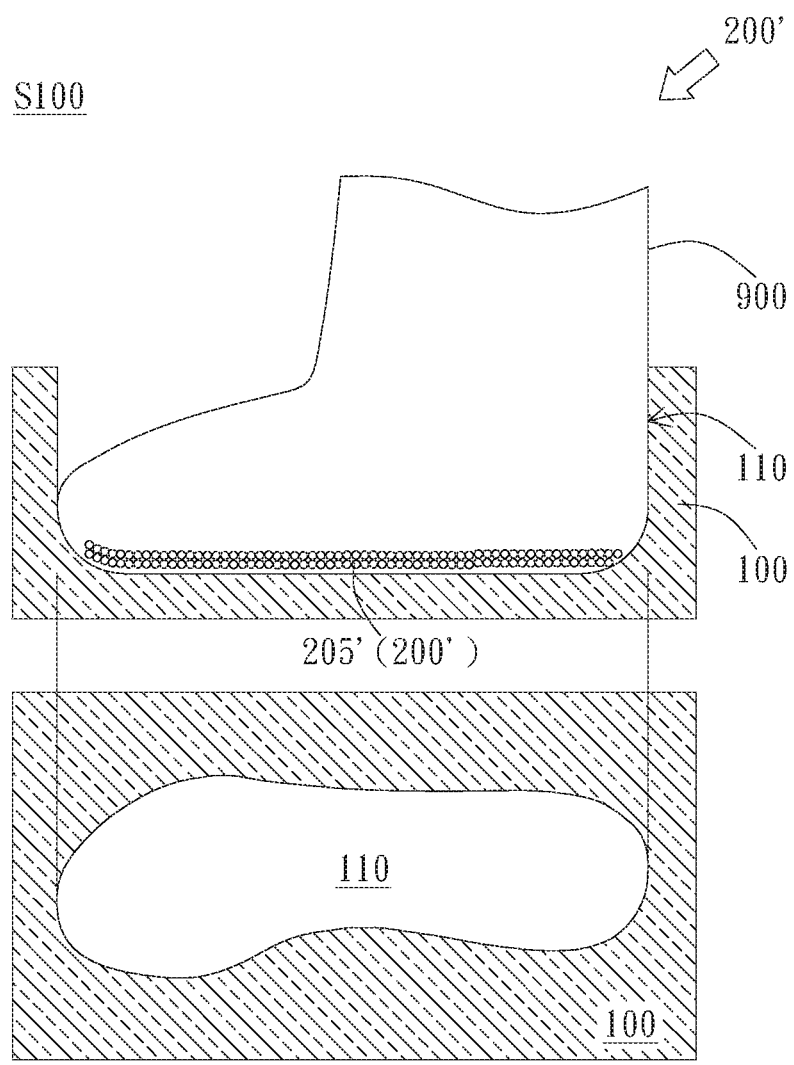
FIGS. 2A-2C illustrate schematic views of setting a foam matrix material according to an embodiment of the invention.
Figure 2B:
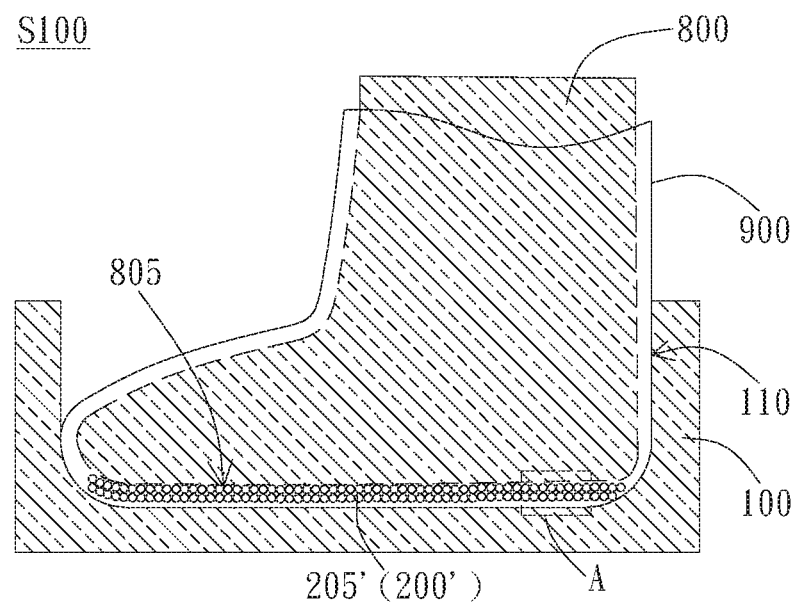

Referring to FIG. 1, according to an embodiment of the invention, a method 10 of manufacturing a shoe structure includes a setting step S100 of setting an upper and a foam matrix material on a shoe last and a foaming step S200 of foaming the foam matrix material. For example, referring to FIG. 1 together with FIGS. 2A-2B, in an embodiment of the method 10, the setting step S100 includes setting an upper 900 on a shoe last 800 and distributing a foam matrix material 200' along a bottom 805 of the shoe last 800 to position the foam matrix material 200' between the shoe last 800 and the upper 900. That is, the upper 900 covers the shoe last 800 and the foam matrix material 200' is positioned on the bottom 805 of the shoe last 800 and wrapped by the upper 900. For example, as shown in FIG. 2A, a mold 100 having a cavity 110 in a shape of a shoe is provided. The upper 900 covers or bears the foam matrix material 200' and is then disposed in the cavity 110, so the mold 100 functions as a base to bear the upper 900. Next, as shown in FIG. 2B, the upper 900 is set on the shoe last 800. For example, the upper 900 is worn on the shoe last 800. It is noted that the configurations illustrated in FIGS. 2A and 2B are merely an example where the upper 900 is sleeved on the shoe last 800 and the upper 900 wraps and positions the foam matrix material 200', but not limited thereto. For example, in another embodiment, the upper 900 may be disposed on the shoe last 800 without using the mold 100, and the foam matrix material 200' is covered by the upper 900 to be positioned between the shoe last 800 and the upper 900. Alternatively, the upper 900 may be firstly set on the shoe last 800, and the foam matrix material 200' is then disposed in the space defined between the shoe last 800 and the upper 900. After that, the shoe last 800 with the upper 900 and the foam matrix material 200' thereon is disposed on the mold 100.

In an embodiment, the shoe last 800 and mold 100 are preferably not affected by microwaves, for example, may be made of materials that do not rise in temperature from being affected by microwaves, and/or materials that can withstand high temperature without deformation. In particular, "not affected by microwaves" means, for example, it cannot be heated by microwaves and can withstand the temperature rise caused by microwave heating. Specifically, an ultra-transparent, low-loss material allows microwaves to easily pass through and not be absorbed; or, a completely opaque material such as a metal conductor reflects all incoming microwaves and does not allow microwaves to penetrate. Such materials, which cannot be heated by microwaves, are not affected by microwaves unless they are denatured or changed (e.g. foaming) by the temperature rise of other materials around them. On the other hand, a high-loss material sensitive to microwaves can absorb the microwaves after the microwaves entered it for a certain distance, hence it can be heated by absorbing microwaves and is a material that can be affected by microwaves. In addition, even if a material is not capable of directly absorbing microwaves and becoming heated, however, if the material can be denatured or changed (such as foaming) by a rise in ambient temperature when other materials in the periphery absorb microwaves, it is a material that can be affected by microwaves.

The shoe last 800, which is not affected by microwaves may be, for example, made of a material that does not rise in temperature by microwaves and/or a material that can withstand high temperature without deformation. In addition, the shoe last 800 may have any suitable shape to form the shoe structures having a desired shape. Further, the shoe last 800 may be formed in an integral configuration or constructed by assembling multiple components.

In an embodiment, the foam matrix material 200' includes a plurality of semi-foamed granules 205' that can be foamed directly by microwave heating or by temperature rise caused by heating other adjacent materials. For example, the semi-foamed granules 205' of the foam matrix material 200' may be high loss materials that can be heated by microwave. Alternatively, in the case where the semi-foamed granules 205' are difficult to be heated by microwaves, an additive which easily absorbs microwaves (for example, $Al_2O_3$—SiC, etc.) may be further added to the foam matrix material 200', so that the semi-foamed granules 205' can be foamed by the temperature increase caused by the absorption of microwaves by the surrounding additives.

In an embodiment, the semi-foamed granules 205' may be made of polyurethane (PU), thermoplastic polyurethane (TPU), thermoplastic elastomer (TPE) or a combination thereof, and can be granules of a certain size with foaming ability after a certain degree of foaming. Specifically, the material of PU, TPU or TPE can be mixed with foaming agent after plastic molding through incomplete foaming to form the semi-foamed granules 205' which still retain foaming ability. For example, the semi-foamed granules 205' may be formed by foaming TPU through semi-foaming (i.e., semi-foamed TPU), but not limited thereto. The semi-foamed granules 205' can be prepared by any means with a certain extent of foaming to form a granule form, and still retain the foaming ability.

Figure 2C:
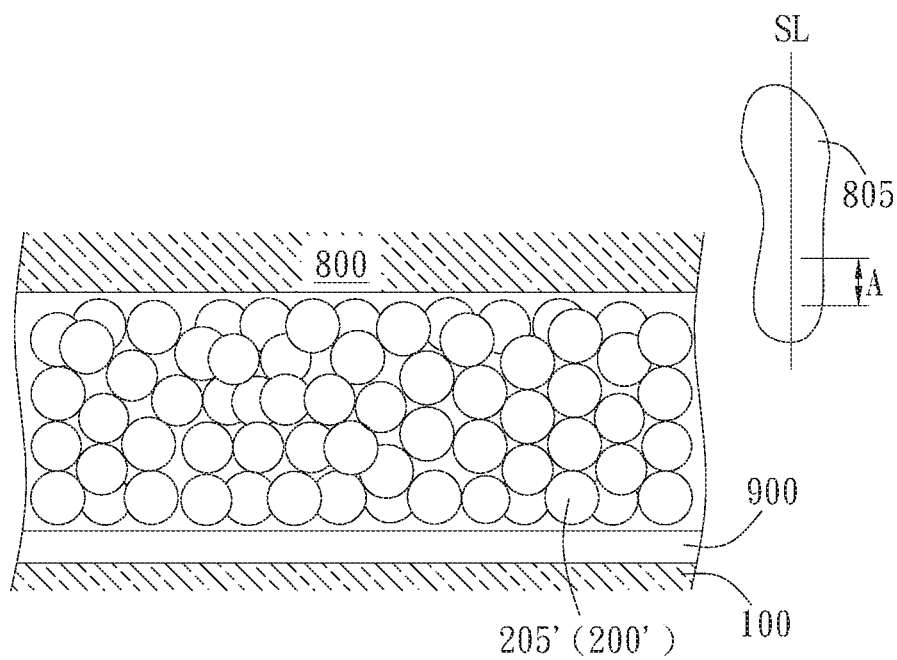
Figure 2D:
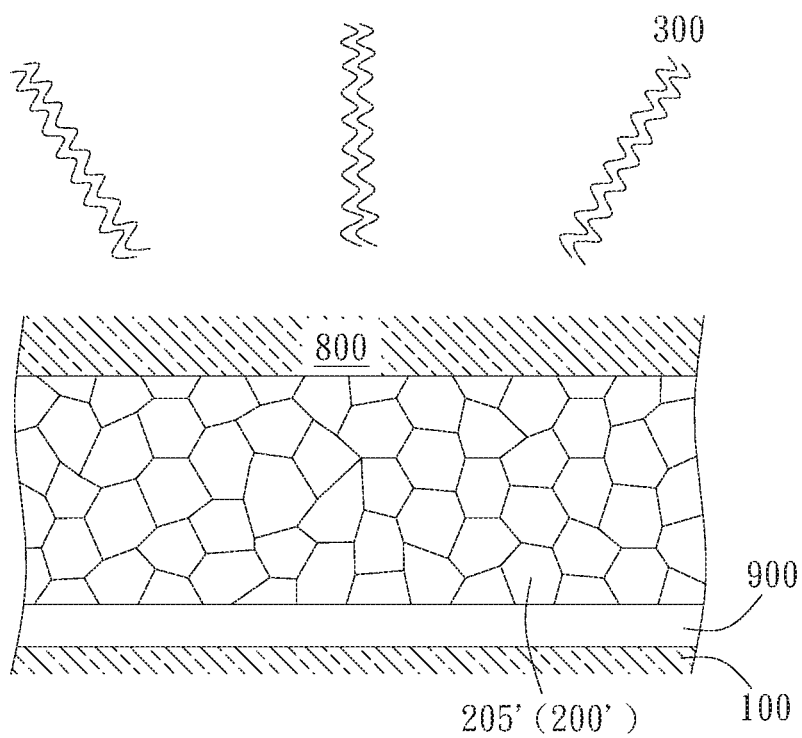
FIG. 2D illustrates a schematic view of foaming through microwave heating according to an embodiment of the invention.

Referring to FIG. 2C, which is an enlarged cross-sectional view of area A in the bottom 805 of FIG. 2B taken along the shoe length direction SL, in the embodiment, the semi-foamed granules 205' may include a plurality of first granules sized within a first grain size range. Since the shape of the granules used with various embodiments of the invention may not be a true sphere but is close to a sphere, the granule size is defined as the length of the largest axis of the granules. In the preferred embodiment, the median of the first grain size range is substantially equal to the average granule size of the first granules. However, due to factors such as process tolerances, a plurality of first granules may be different in granule size, and the average granule size thereof is not necessarily equal to the median granule size. In addition, the first granules with substantially equal granule size mentioned above is only an example. That is, in other embodiments, the semi-foamed granules 205' may be configured according to requirements and designs to contain various granules sized within different granule sizes ranges, which will be further described below.

Figure 3:
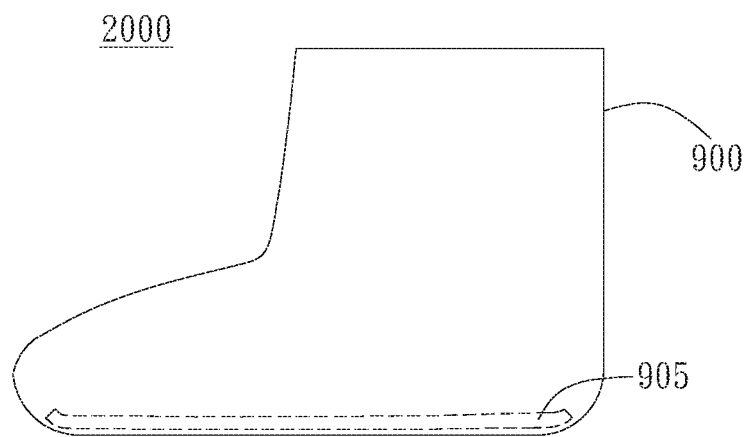
FIG. 3 illustrates a schematic view of the shoe structure manufactured by the method of FIGS. 2A-2D.

Referring to FIG. 1 and FIGS. 2A-2D, in the method 10, the foaming step S200 includes heating the shoe last 800 with the upper 900 and the foam matrix material 200' thereon through microwave heating, so that the shape of the upper 900 is set based on the contour of shoe last 800, and the semi-foamed granules 205' are foamed and pressed against each other due to the temperature rise by microwave heating. In other words, the shoe last 800, the upper 900 and the foam matrix material 200' that includes the semi-foamed granules 205' (i.e. first granules) are heated together by microwave 300. Thereby, the semi-foamed granules 205' can effect foaming; for example, the foaming due to the temperature rise of itself caused by microwaves 300 or the temperature rise caused by surrounding materials such as additives. As a result, after foaming, the surfaces of the semi-foamed granules 205' are pressed against and welded to each other. Thus, as shown in FIG. 3, an integral shoe structure 2000 is formed after cooling and removing the shoe last 800 (and the mold 100 if used). The shoe structure 2000 includes the upper 900, which is shaped according to the contour of the shoe last 800 and has a cavity, and a foam molded body 905 shaped and bonded to the upper 900. For example, the foam molded body 905 may be formed inside the cavity as an insole of the shoe structure 2000, and the foam molded body 905 may have a foaming structure, which has a plurality of granules pressed against and welded to each other by surfaces thereof and is formed by, for example, foaming TPU. The foam molded body 905 is an integrally-formed body, instead of a scattered combination. In other words, the foam molded body 905 is integrally formed and bonded to the upper 900 through microwave heating to be a part of the shoe structure 2000, such as an insole.

Figure 4A:
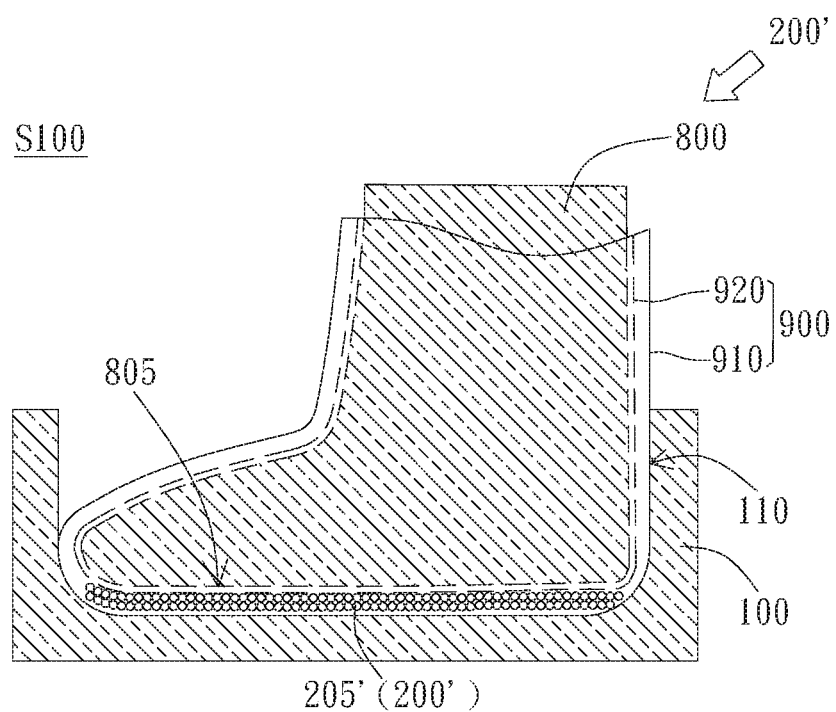
FIGS. 4A-4B illustrate schematic views of setting a foam matrix material and foaming through microwave heating according to another embodiment of the invention.
Figure 4B:
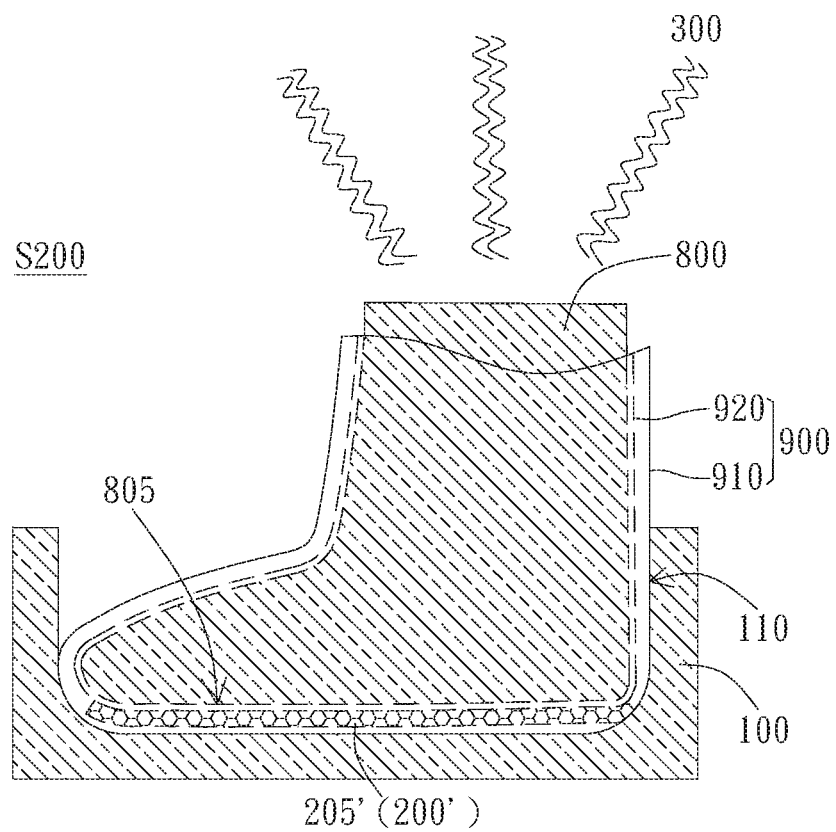

Referring to FIGS. 4A-4B, in another embodiment, the disposition of the upper 900, the shoe last 800, and the foam matrix material 200' will be described.

Figure 5:
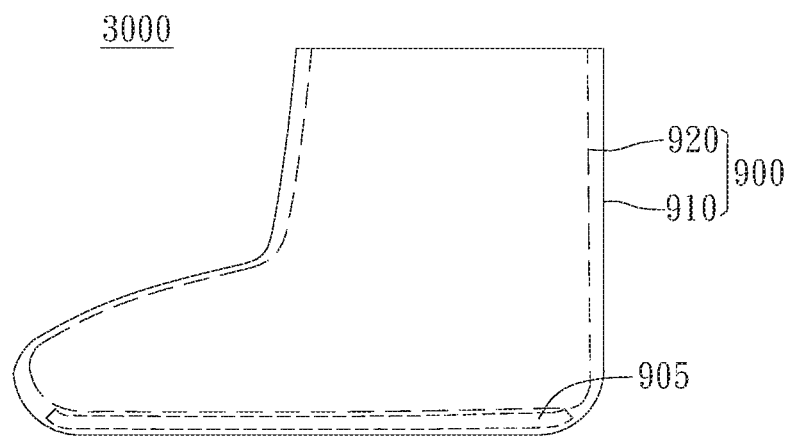
FIG. 5 illustrates the shoe structure manufactured by the method of FIGS. 4A-4B.

As shown in FIG. 4A, in the setting step S100, the shoe last 800 may be covered with a double-layer upper 900, and the structure of the above-mentioned foam molded body can be further formed between the double-layer upper 900. Specifically, the upper 900 has a dual-layered structure including an inner layer 920 and an outer layer 910, and the foam matrix material 200' (including the semi-foamed granules 205') is distributed between the inner layer 920 and the outer layer 910 along the bottom 805 of the shoe last 800. As shown in FIG. 4B, the semi-foamed granules 205' are also foamed by microwave heating in the foaming step S200 (for example, foaming due to temperature rise of itself caused by microwaves 300 or temperature rise caused by surrounding materials such as additives). As shown in FIG. 5, after cooling and removing the shoe last 800 (and the mold 100 if exists), an integral shoe structure 3000 including the upper 900, which has a cavity and is shaped according to the contour of the shoe last 800, and the foam molded body 905 shaped and bonded between the inner layer 920 and the outer layer 910 is formed. In other words, the foam molded body 905 is integrally formed and bonded to the upper 900 through microwave heating to be a part of the shoe structure 3000, such as an insole.

Figure 6A:
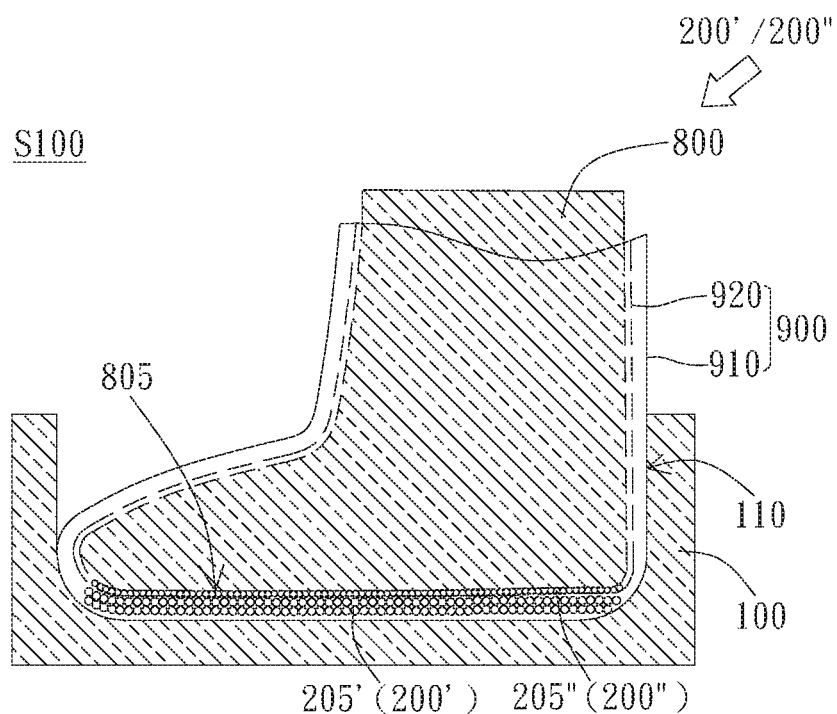
FIGS. 6A-6B illustrates schematic views of setting a foam matrix material and foaming through microwave heating according to another embodiment of the invention.
Figure 6B:
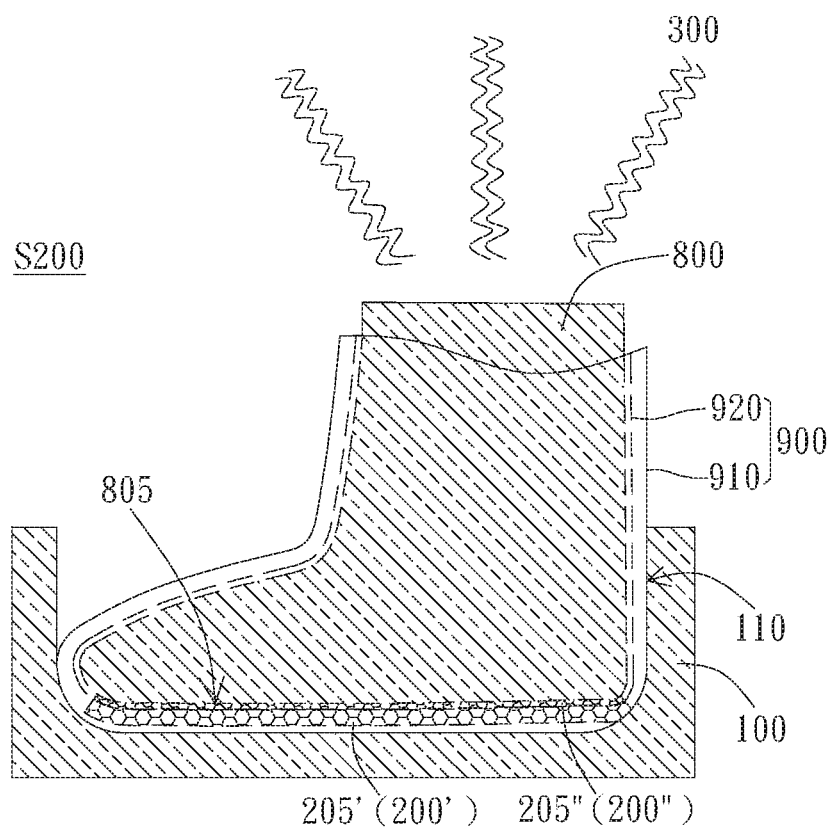
Figure 7:
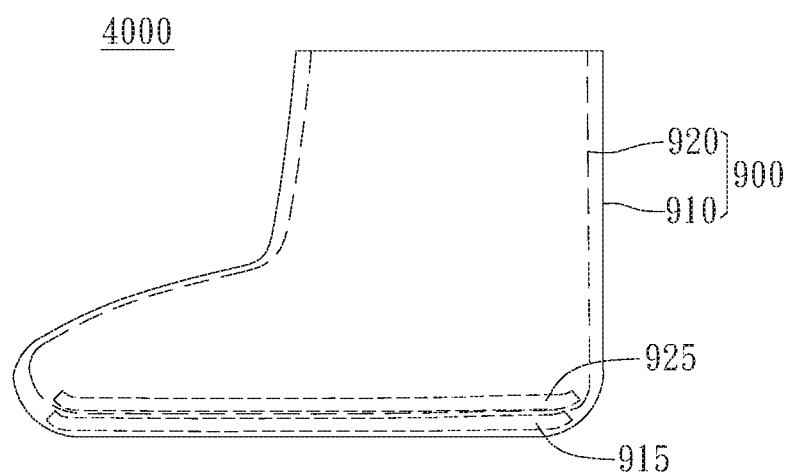
FIG. 7 illustrates the shoe structure manufactured by the method of FIGS. 6A-6B.

In addition, according to other embodiments of the invention, when the upper 900 that has a dual-layered structure is disposed as shown in FIGS. 4A-5, the foam matrix material can be distributed between the inner layer 920 of the upper 900 and the shoe last 800, between the inner layer 920 and the outer layer 910 of the upper 900, or a combination thereof (i.e. between the inner layer 920 of the upper 900 and the shoe last 800 as well as between the inner layer 920 and the outer layer 910 of the upper 900). For example, in an embodiment, referring to FIGS. 6A and 6B, in the setting step S100, the upper 900 that covers the shoe last 800 has a dual-layered structure including the outer layer 910 and the inner layer 920, and the foam matrix material 200' (including the semi-foamed granules 205') can be distributed between the inner layer 920 and the outer layer 910 along the bottom 805 of shoe last 800, and a foam matrix material 200" (including semi-foamed granules 205") can be distributed between the inner layer 920 and the shoe last 800 along the bottom 805 of the shoe last 800. As shown in FIG. 6B, the semi-foamed granules 205' and 205" are also foamed by microwave heating in the foaming step S200 (for example, foaming due to temperature rise of itself caused by microwaves 300 or temperature rise caused by surrounding materials such as additives). As shown in FIG. 7, after cooling and removing the shoe last 800 (and the mold 100 if exists), an integral shoe structure 4000 including the upper 900, which has a cavity and is shaped according to the contour of the shoe last 800, a foam molded body 915 shaped and bonded between the inner layer 920 and the outer layer 910, and a foam molded body 925 shaped and bonded to the inner layer 920 is formed. In other words, the foam molded bodies 915 and 925 are integrally formed and bonded to the upper 900 through microwave heating to be a part of the shoe structure 4000, such as a double-layer insole.

As described above, since the method of manufacturing a shoe structure and the so prepared shoe structure according to the invention can be used for the manufacture of a shoe, according to other embodiments of the invention, the foam molded body can be further attached to other parts of the shoe structure or made into other parts of the shoe structure at the same time that the foam molded body (e.g. the insole) is completed. Therefore, the manufacturing process can be further simplified and the manufacturing time or cost can be reduced.

Figure 8A:
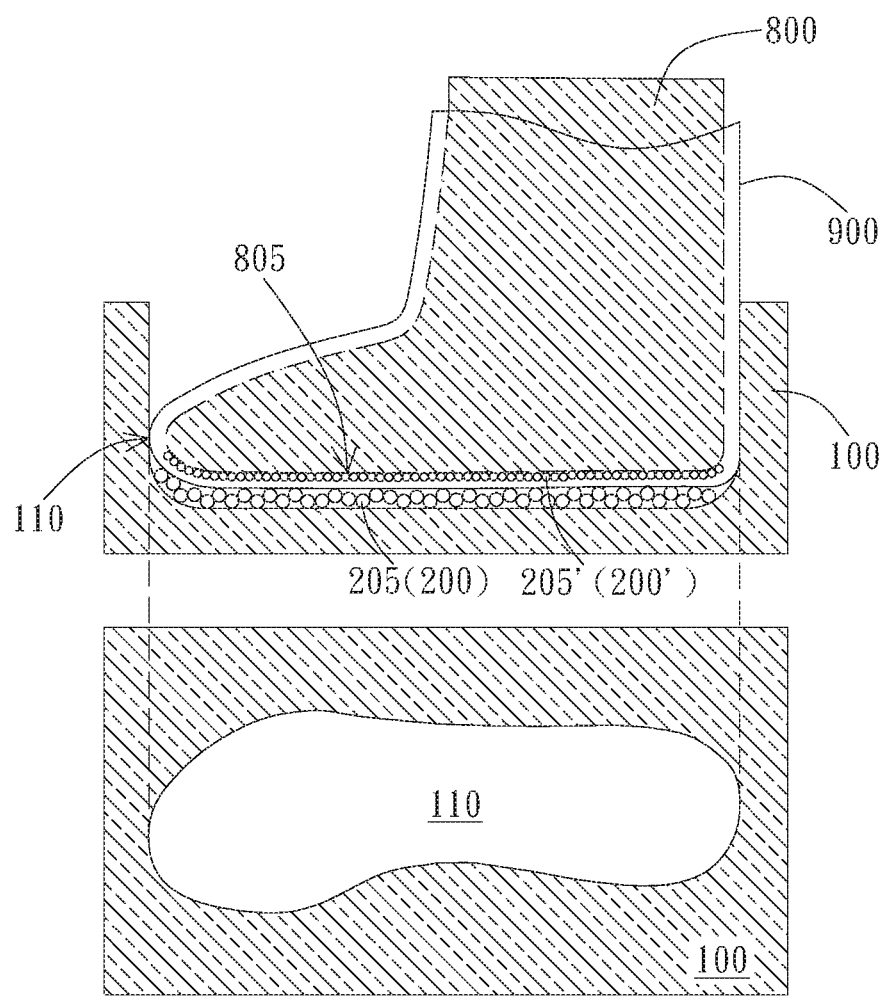
FIG. 8A illustrates a schematic view of forming an insole and a midsole simultaneously by setting the foam matrix material according to an embodiment of the invention.
Figure 8B:
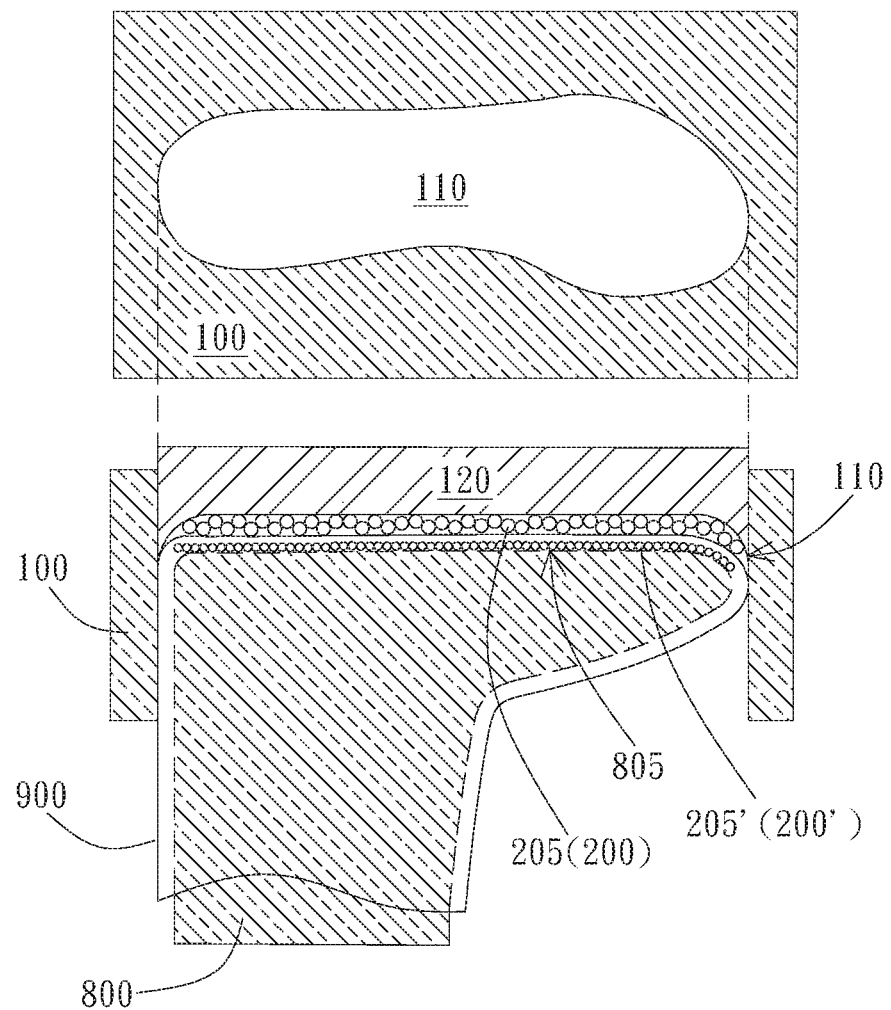
FIG. 8B illustrates a schematic view of forming an insole and a midsole simultaneously by setting the foam matrix material according to another embodiment of the invention.

For example, before the foaming step S200, semi-foamed granules 205, which may be of the same or different material from the semi-foamed granules 205'/205" can be additionally distributed and laid along the bottom 805 of the shoe last 800 outside the upper 900. Specifically, as shown in FIGS. 8A-8B, in an embodiment, before the foaming step 200, the shoe last 800 with the upper 900 thereon can be disposed on the mold 100, which is not affected by microwaves, and the semi-foamed granules 205 (e.g. a foam matrix material 200 including the semi-foamed granules 205), which may be of the same or different material from the semi-foamed granules 205'/205" is disposed and laid along the bottom 805 of the shoe last 800 in a space defined by the cavity 110 of the mold 100 and the upper 900. The cavity 110 of the mold 100 has a shape of a shoe component, such as midsole. As such, the foam matrix material 200 including the semi-foamed granules 205 is distributed on the upper 900 to have a shape of a midsole.

It is noted that setting the shoe last 800 on the mold 100 is a relative concept, and is not limited to disposing the shoe last 800 on top of the mold 100 in the direction of gravity. For example, according to the embodiment shown in FIG. 8A, it can occur in the sequence that after the foam matrix material 200, which includes the semi-foamed granules 205 is set in the mold 100 in the setting step S100, and then the shoe last 800 covered with an upper 900 is placed above the mold 100 (i.e., in the direction of gravity). Alternatively, according to the embodiment illustrated in FIG. 8B, the shoe last 800 covered with the upper 900 is first placed in the mold 100 (i.e., in the direction opposite to the direction of gravity), and the cavity 110 with the foam matrix material 200 is delimited by the mold 100 and the bottom 805 of the shoe last 800 covered with upper 900. Next, the foam matrix material 200 including the semi-foamed granules 205 is placed in the mold 100 and carried by the bottom 805 of the shoe last 800 covered with the upper 900. In such a configuration, the mold 100 can further include a cover 120. After the foam matrix material 200 is disposed, the cover 120 id disposed on the mold 100 to define the foaming space for the foam matrix material 200.

Figure 9:
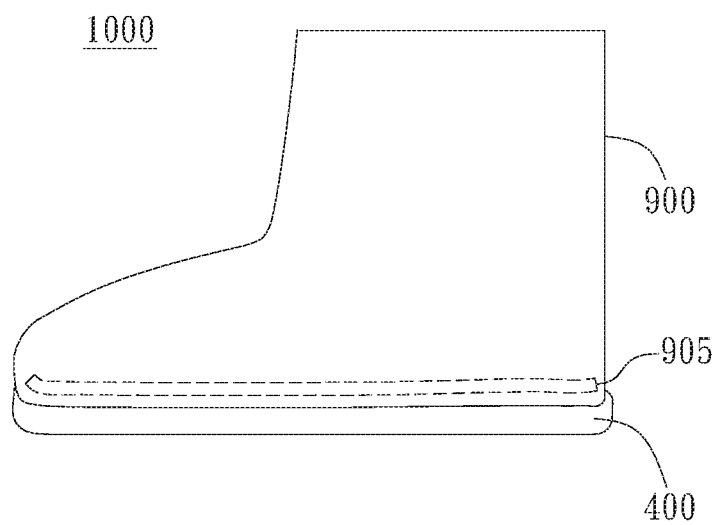
FIG. 9 illustrates a schematic view of the shoe structure formed through microwave heating the configurations of FIGS. 8A-8B.

As shown in FIG. 8A and FIG. 8B, before the foaming step S200, the shoe last 800 with the upper 900 and the foam matrix material 200' thereon may be further disposed on the mold 100 such that at least part of the upper 900 is in contact with the semi-foamed granules 205, and the semi-molded granules 205 disposed in the mold 100 are distributed along the bottom 805 of the shoe last 800. Therefore, when the semi-molded granules 205 are foamed by microwave heating in a fixed space in the foaming step S200, the surfaces of semi-foamed granules 205 can be welded to each other via foaming in a manner similar to that of the semi-foamed granules 205' or 205" (for example, foaming due to temperature rise of itself caused by microwaves or due to temperature rise caused by surrounding materials such as additives), to form a foam molded body which is bonded to the upper 900 at the same time. That is, referring to FIG. 9, independent of the foam molded body 905, the semi-molded granules 205 may form an integrally-formed shoe component (i.e., the foam molded body 400), which is bonded to the outer surface of the upper 900 at the point corresponding to the bottom 805 of the shoe last 800. Therefore, after the foaming step S200, the shoe last 800 and the mold 100 can be removed to form the shoe structure 1000, which combines the shoe upper 900, the foam molded body 90 (e.g. the insole in the cavity of the upper 900), and the foam molded body 400 (e.g. the midsole outside the upper in a shape set according to the cavity 110 of the mold 100), and the extra process of bonding the shoe components with the upper 900 is not necessary after forming the shoe components.

According to some embodiments of the invention, in order to make the foam molded body more smoothly bonded to the upper 900 while being formed, the upper 900 may contain a material such as PU, TPU or TPE which does not foam or has a negligible foaming capability. For example, the upper 900 may be knitted or woven from PU, TPU, or TPE yarns. However, the invention is not limited thereto insofar as it can be bonded to the foam molded body.

Further, although not shown in the drawings, according to other embodiments of the invention, the outsole material or the outsole can be laid on the semi-famed granules 205 before the foaming step S200. For example, with the shoe last 800 and the upper 900 set, the outsole material or the outsole can be laid on the side of the semi-foamed granules 205 opposite to the shoe last 800 and the upper 900. In addition, when the outsole material or the outsole is scattered and not completely laid on the surface of the foam matrix materials 200, the outsole material or the outsole can be laid on the surface of the foam matrix materials 200 according to the pattern expected of the outsole of the shoe. Thereby, one can optionally form the outsole, the foam molded body 400 (e.g. the midsole), the upper 900, and the foam molded body 905 (e.g. the insole) at the same time by welding their surfaces to each other in the foaming step S200.

According to some embodiments of the invention, in order to make the shoe component (i.e., the foam molded body 400) more smoothly bonded to the sole or the sole material while forming, the sole or the sole material may include materials such as PU, TPU or TPE that do not foam or have a negligible foaming capability. However, the invention is not limited to this when it can be bonded with the shoe component (i.e., foam molded body 400).

Figure 10A:
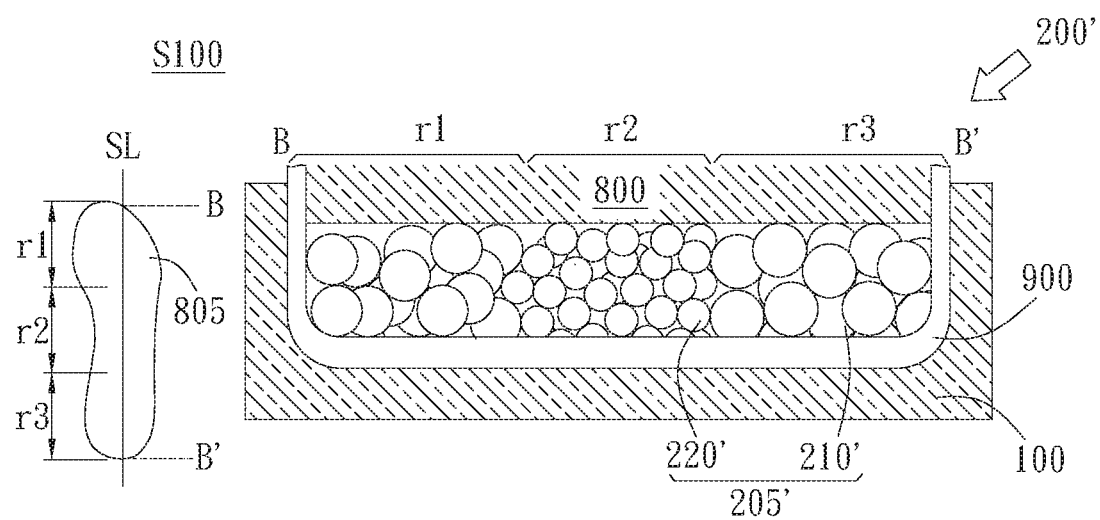
FIGS. 10A-10B illustrate schematic views of foaming through microwave heating the foam matrix material having semi-foamed granules of different gran sizes according to another embodiment of the invention.
Figure 10B:
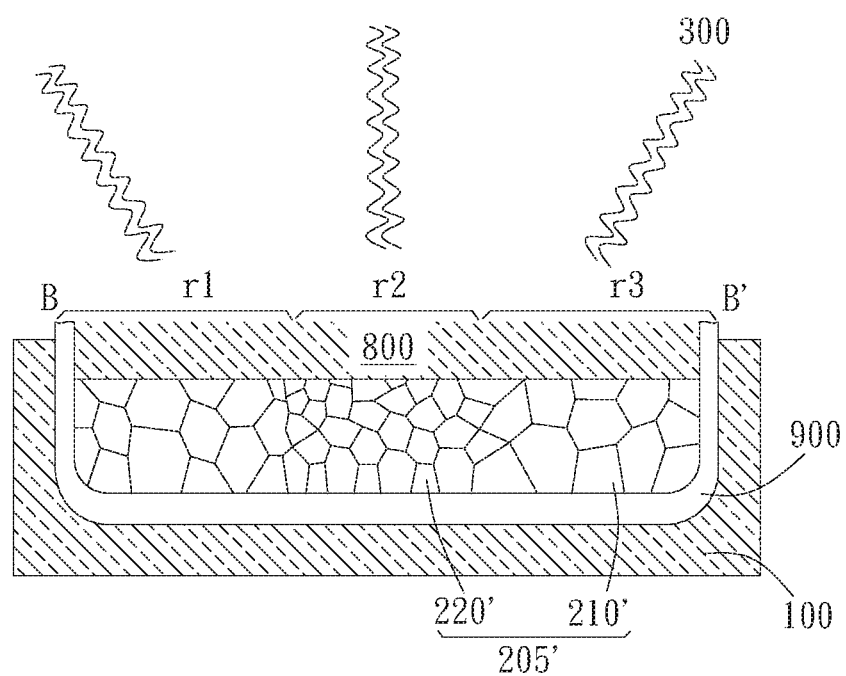

Referring to FIGS. 10A-10B, another embodiment of disposing a foam matrix material 200' and foaming the foam matrix material 200' by microwave heating will be described.

As shown in FIG. 10A, in an embodiment, different from the embodiments shown in FIGS. 2A-3, a plurality of first granules 210' sized within a first grain size range and a plurality of second granules 220' sized within a second grain size range are respectively placed in different regions r1, r2, and r3 in the step of setting S100. That is, the semi-foamed granules 205 may include: a plurality of first granules 210' sized within a first grain size range and a plurality of second granules 220' sized within a second grain size range, and the first granules 210' and the second granules 220' can be set separately in different regions.

In an embodiment, the median of the first grain size range is substantially greater than the median of the second grain size range. That is, the first granules 210' are substantially larger than the second granules 220'. In the preferred embodiment, the median of the first grain size range is substantially equal to the average granule size of the first granules 210' and the median of the second grain size range is substantially equal to the average granule size of the granules 220'. However, due to factors such as process tolerance, there may be differences in granule size among the plurality of first granules 210' or among the plurality of second granules 220', and the average granule size thereof is not necessarily equal to the median.

As described above, the first granules 210' and the second granules 220' of different sizes may be disposed in different regions', respectively. For example, in the area B-B' taken along the shoe length direction SL of the bottom 805, three regions r1, r2, and r3 are defined between the upper 900 and the shoe last 800. The first granules 210' may be disposed in the region r1 and the region r3, and the second granules 220' may be disposed in the region r2. However, the above are merely examples. Several different regions in other forms can be defined between the upper 900 and the shoe last 800, and the first granules 210' and the second granules 220' can be respectively disposed in different regions. In addition, according to other embodiments of the invention, it is also possible to further include other granules sized within different grain size ranges according to the above principles, and these granules are different from the first granules 210' and the second granules 220', and are additionally disposed in different regions, respectively, but not limited thereto.

Figure 11:
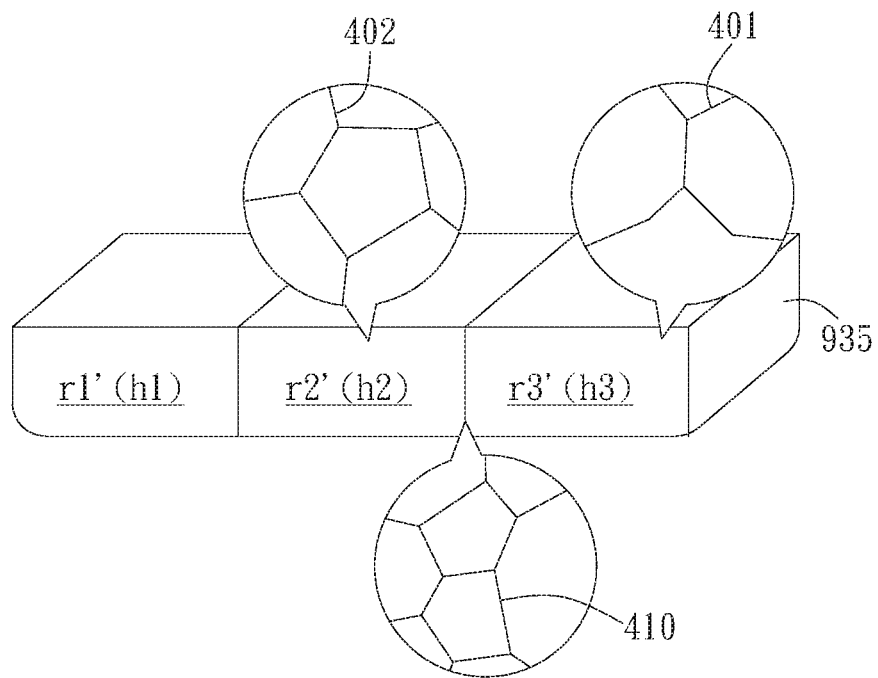
FIGS. 11-12 illustrate schematic views of the foam molded body manufactured by the method of FIGS. 10A-10B and a shoe structure including the foam molded body

After the foam matrix material 200' is disposed as described above, the foaming step S200 may be performed by using microwaves 300 to heat the content to effect foaming (for example, foaming due to temperature rise of itself caused by microwaves 300 or temperature rise caused by surrounding materials such as additives). Thereby, the surfaces of the semi-foamed granules 205' are welded to each other to form an integrally-formed foam molded body 935, as shown in FIG. 11.

Specifically, as shown in FIG. 6, the semi-foamed granules 205' corresponding to the region r1 where the first granules 210' are originally disposed are formed as the first part r1' of the foam molded body 935, the semi-foamed granules 205 corresponding to the region r2 where the second granules 220' are originally disposed are formed as the second part r2' of the foam molded body 935, and the semi-foamed granules 205 corresponding to the region r3 where the first granules 210' are originally disposed are formed as the third part r3' of the foam molded body 935. The second part r2' formed by the smaller second granules 220' has a higher density relative to the first part r1' and the third part r3' formed by the larger first granules 210'. Therefore, the second part r2' may have a higher hardness with respect to the first part r1' and the third part r3'. That is, the hardness h2 of the second part r2' may be higher than the hardness h1 of the first part r1' and the hardness h3 of the third part r3'. In other words, the hardness of the part formed by the first granules 210' is less than the hardness of the part formed by the second granules 220'. In addition, although only the first granules 210' and the second granules 220' are used in the present embodiment to form the foam molded body 935 with the two different hardness or softness, according to other embodiments of the invention, when it is expected that each part of the foam molded body 935 should have more than three kinds of harness or softness, other granules having other granules size ranges may be added corresponding to the above principle, and the invention is not limited thereto.

Further, according to some embodiments of the invention, in a completed foam molded body 935, the borders of the granules formed by mutual fusion of the surfaces of the semi-foamed granules 205' can be seen. For example, the granule borders 401 in the first part r1' and the third part r3' formed by the foaming of the first granules 210' can be observed, and the granule borders 402 in the second part r2' formed by the foaming of the second granules 220' can also be observed. The density of the granule borders 401 formed by the foaming of the first granules 210' may be lower than the density of the granule borders 402 of the part formed by the second granules 220'. In addition, the granule borders 410 between the first part r1' and the second part r2' or between the third part r3' and the second part r2' formed by the first granules 210' welded to the second granules 220' can also be observed. According to some embodiments of the invention, the granule borders of the foam molded body 935 may be difficult to see by the naked eye, or the granule borders may even be eliminated due to high degree of fusion between the surfaces after foaming. As such, the above description is merely exemplary of the granule borders, and the invention is not limited thereto.

Figure 12:
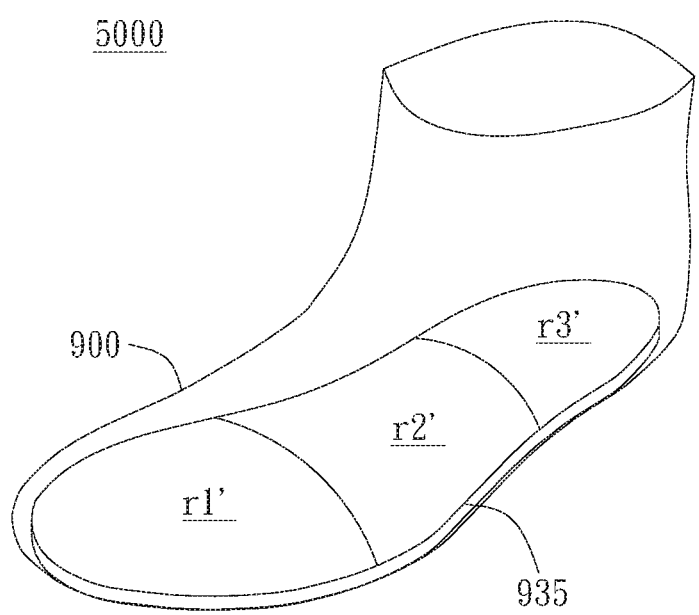

As described above, the hardness or softness of each part of the foam molded body 935 can be configured and prepared on the basis of requirements and designs. For example, when the shoe structure 5000 of FIG. 12 with the foam molded body 935 (e.g. the insole) integrally bonded to the upper 900 is formed according to the above manner of FIGS. 10A-10B after cooling and removing the shoe last 800 (and the mold 100 if exists), by disposing the granules of different sizes to different regions, the hardness or softness can be controlled based on factors such as the comfort expected for the wearer's foot. For example, the softer part r1' of the foam molded body 935 (e.g., midsole, sole or insole) may correspond to the part of the insole that is expected to be in contact with the wearer's foot to increase wearing comfort, and the harder part r2' corresponds to the part of the insole that is not expected to be in contact with the wearer's foot to increase support. However, the above descriptions are merely examples, and the invention is not limited thereto.

Figure 13A:
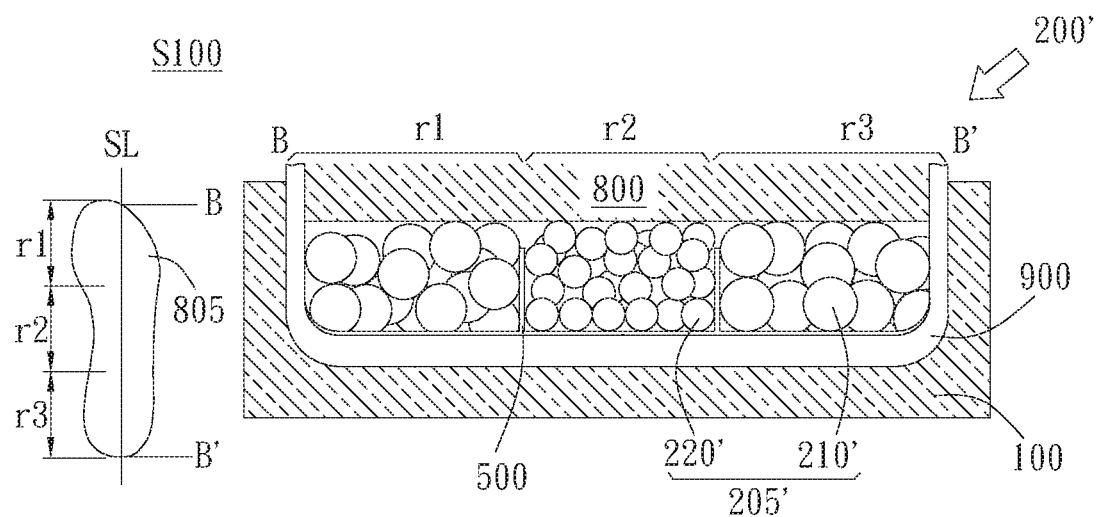
FIGS. 13A-13B illustrate schematic views of foaming through microwave heating the foam matrix material having semi-foamed granules of different gran sizes positioned by a positioning element according to another embodiment of the invention.
Figure 13B:
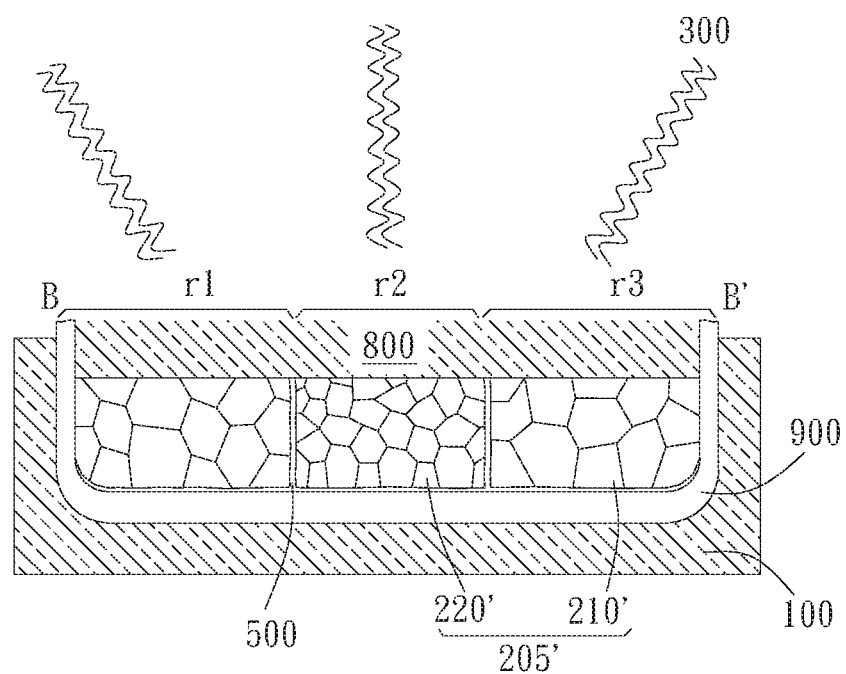

Further, referring to FIG. 13, in another embodiment, in order to dispose the semi-foamed granules 205' including the first granules 210' and the second granules 220' to different regions according to design or requirements, one or more partitions 500 can be disposed between the upper 900 and the shoe last 800 to divide the space between the upper 900 and the shoe last 800 into different regions, r1, r2, and r3. Then, the first granules 210' sized and the second granules 220 are respectively placed in different regions r1, r2 and r3 separated by the partitions 500. Specifically, in the embodiment of FIGS. 10A-10B disposing the granules without the partitions 500, the granules of different sizes are preferably disposed in a layer-by-layer stack manner. In the embodiment of FIGS. 13A-13B disposing the granules with the partitions 500, the granules of different sizes are preferably disposed in a region-by-region manner according to the grain size range. For example, the first granules 210' can be firstly disposed in the regions r1 and r3 till reaching the expected stack height, and then, the second granules 220' are disposed in the region r2 till reaching the expected stack height, but not limited thereto.

After the foam matrix material 200' is disposed as described above, the partition 500 can be removed before performing the foaming step S200. In another embodiment, when the partitions 500 is made of semi-foamed materials similar to the semi-foamed granules 205', the partitions 500 are not necessary to be removed before the foaming step S200. As shown in FIG. 13B, in the foaming step S200, the partitions 500 and the semi-foamed granules 205' are heated by microwave 300 to effect foaming (for example, foaming due to temperature rise of itself caused by microwaves 300 or temperature rise caused by surrounding materials such as additives). As such, the partitions 500 are welded to the surfaces of the semi-foamed granules 205' to form an integrally-formed foam molded body 935 (e.g. the insole) with different hard or soft regions similar to FIG. 11 or 12.

Figure 14A:
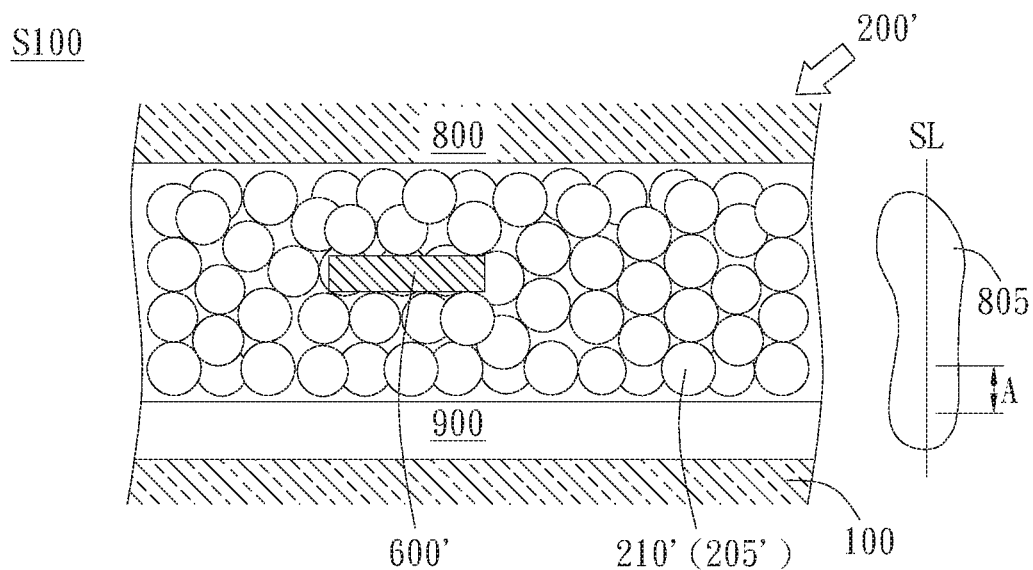
FIGS. 14A-14B illustrate schematic views of foaming through microwave heating the foam matrix material having an auxiliary element according to another embodiment of the invention.
Figure 14B:
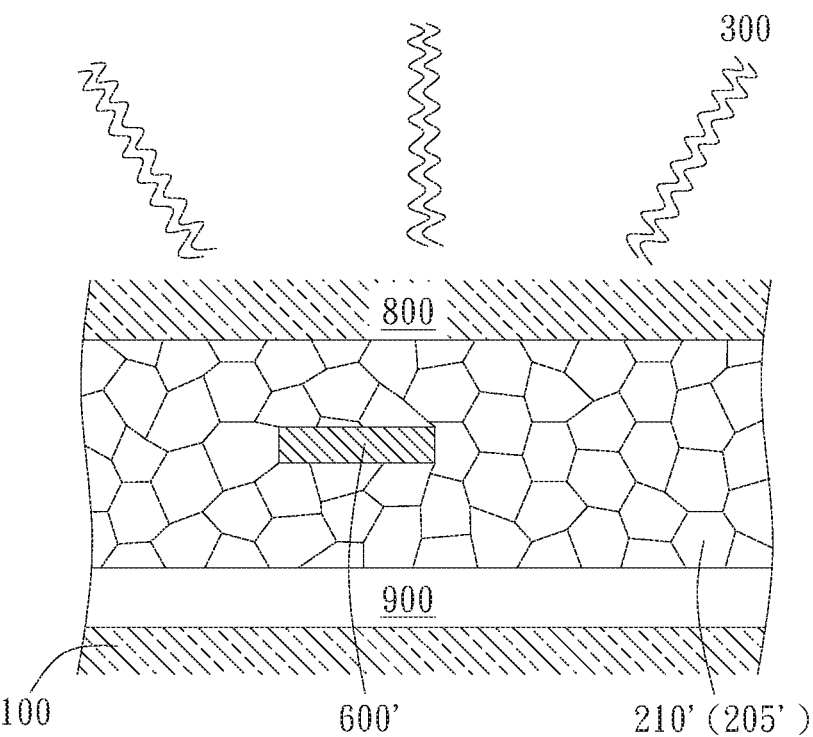
Figure 15:
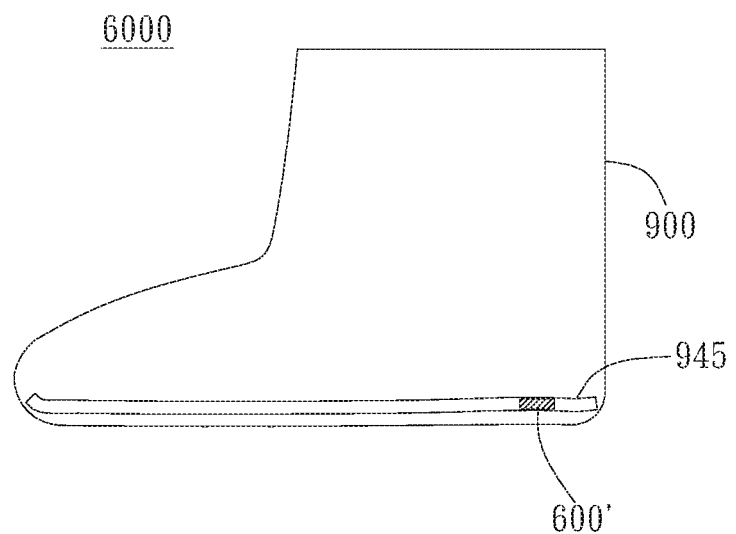
FIG. 15 illustrates a schematic view of a shoe structure manufactured by the method of FIGS. 14A-14B.

The manufacturing methods and the shoe structures shown in FIGS. 1-13B can further include an auxiliary element as an embedded component. Referring to FIG. 14A, before the foaming step 200, in an embodiment, an auxiliary element 600' and the semi-foamed granules 205' (e.g. the first granules 210') are together disposed between the upper 900 and the shoe last 800 in the setting step S100. That is, in addition to the semi-foamed granules 205', the foam material matrix 200' further includes the auxiliary element 600'. Specifically, the auxiliary element 600' can be directly arranged between the upper 900 and the shoe last 800 to be arranged together with the semi-foamed granules 205'. The auxiliary element 600' is a material that is not affected by microwaves or made of the material. For example, the auxiliary element 600' is made of a material that cannot be heated by microwaves, and thus the auxiliary element 600' can retain its original properties and forms after being microwaved. As shown in FIG. 14B, in the foaming step S200, the auxiliary element 600' is not affected by microwaves 300, for example, not effects foaming by microwave heating. In the foaming step S200, the semi-foamed granules 205' can effect foaming, so that the surfaces of the semi-foamed granules 205' are squeezed and welded to each other, making the auxiliary element 600' therein also pressed and fixed. Thus, as shown in FIG. 15, a foam molded body 945 which is embedded with the auxiliary element 600' is integrally formed after cooling and demolding. That is, the auxiliary element 600' may be squeezed and firmly embedded in the foamed structure in which the surfaces of the semi-foamed granules 205' are squeezed and welded to each other by foaming. Referring to FIGS. 14A-14B, and FIG. 15, the auxiliary element 600' can be embedded in the integrally-formed foam molded body 945 as a dissimilar material while retaining the original shape and functional properties, so that a shoe structure 6000 embedded with the auxiliary element 600' is formed. The auxiliary element 600' can be embedded in other suitable methods, not limited to the above embodiment.

In an embodiment, for example, the auxiliary element 600' may include a chip, a metal sheet, or any objects that are made of non-polar materials and cannot be heated by microwaves or that are made of other materials that are not affected by microwaves and can used as a decoration or functional component of the shoe structure 6000. For example, in an embodiment, the auxiliary element 600' can be a GPS tracking chip, so that the real-time location of the wearer, such as sports participant or disability person, can be tracked. In another embodiment, the auxiliary element 600' can be an object used for measuring blood pressure, body fat, or a chip for step counting, to inspect the health or sport condition. However, the above is merely an example, and the invention is not limited thereto.

Figure 16A:
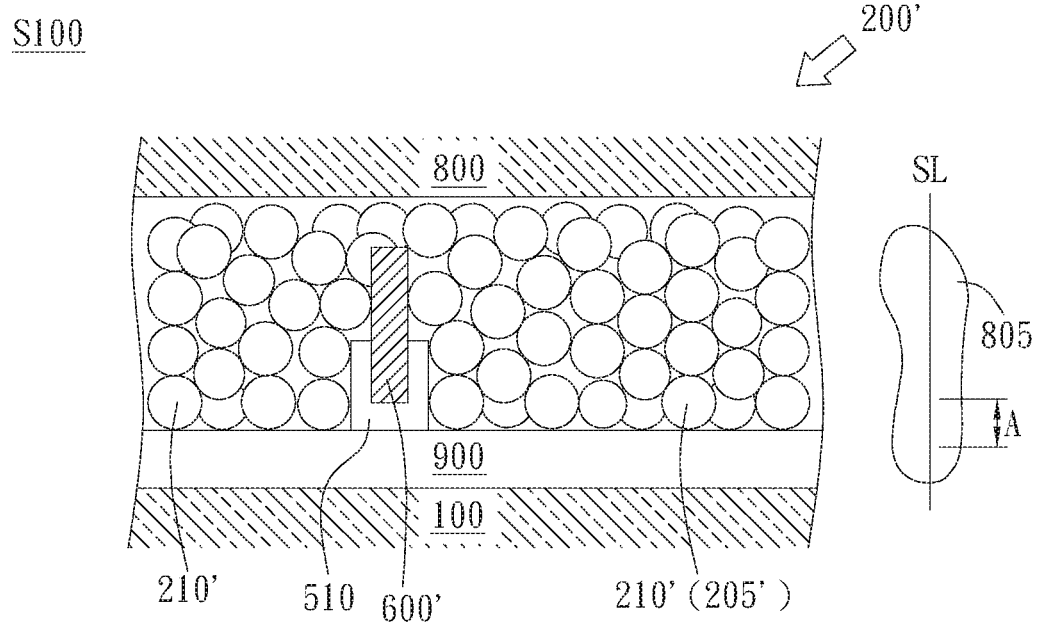
FIGS. 16A-16B illustrate schematic views of foaming through microwave heating the auxiliary element positioned by the positioning element according to another embodiment of the invention.
Figure 16B:
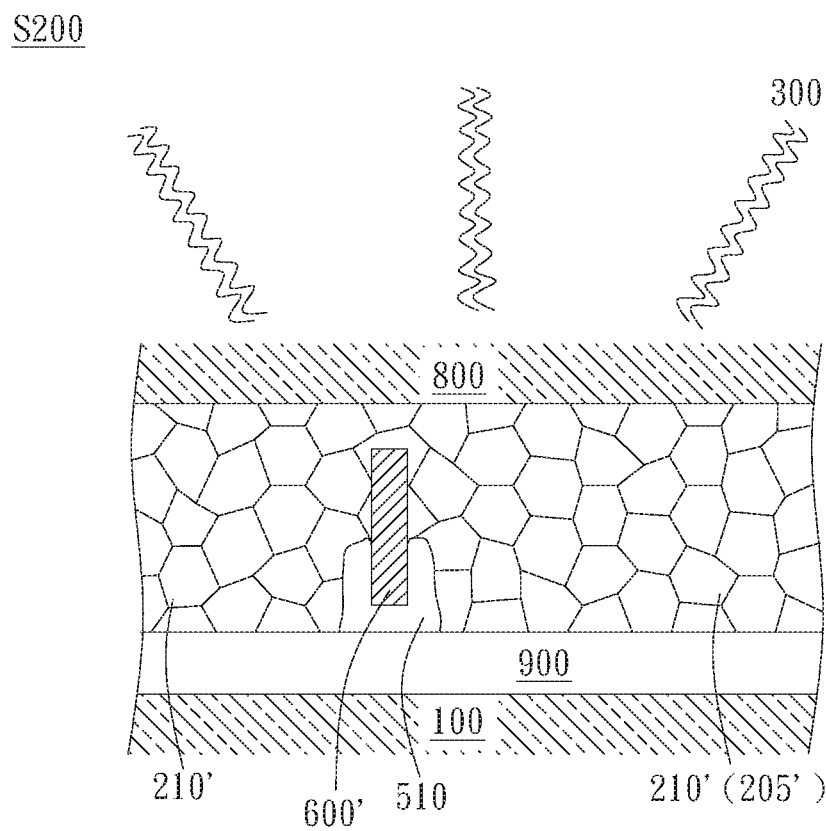

Referring to FIG. 16A, in another embodiment, in order to make the auxiliary element 600' set exactly in a desired position, in the setting step S100, one or more positioning elements 510, such as base, can be used to place the auxiliary element 600'. One would then place at least one of the positioning elements 510, which holds the auxiliary element 600' between the upper 900 and the shoe last 800 together with the semi-foamed granules 205'. As shown in FIG. 16B, the foaming step S200 can be performed by using microwaves 300 to heat and effect foaming (for example, foaming due to temperature rise of itself caused by microwaves 300 or temperature rise caused by surrounding materials such as additives). Thereby, the surfaces of the semi-foamed granules 205' are welded to each other, and the auxiliary element 600' is not affected by microwaves 300, for example, not effects foaming by microwave heating, so that similar to FIG. 15, a foam molded body 945 which is embedded with the auxiliary element 600' is integrally formed after cooling and demolding. Here, the positioning element 510, such as the base, may be foamed by microwave heating together with the semi-foamed granules 205' and welded to the semi-foamed granules 205' in the foaming step S200 (for example, foaming due to temperature rise of itself caused by microwaves 300 or temperature rise caused by surrounding materials such as additives), to form an integrally-formed object.

Further, according to other embodiments of the invention, one or more film-like members 700 may be partially disposed in the setting step S100 to be in contact with the semi-foamed granules 205' (for example, the first granules 210'). The film-like members 700 may include, for example, a material that can be heated by microwaves. For example, the film-like members 700 may include a material similar to the semi-foamed granules 205', or the material that may be bonded to the semi-foamed granules 205' after microwaving. For example, the film-like members 700 can include a material such as PU, TPU or TPE. Therefore, after microwaving, the film-like members 700 can be bonded to the foaming semi-foamed granules 205'.

Figure 17:
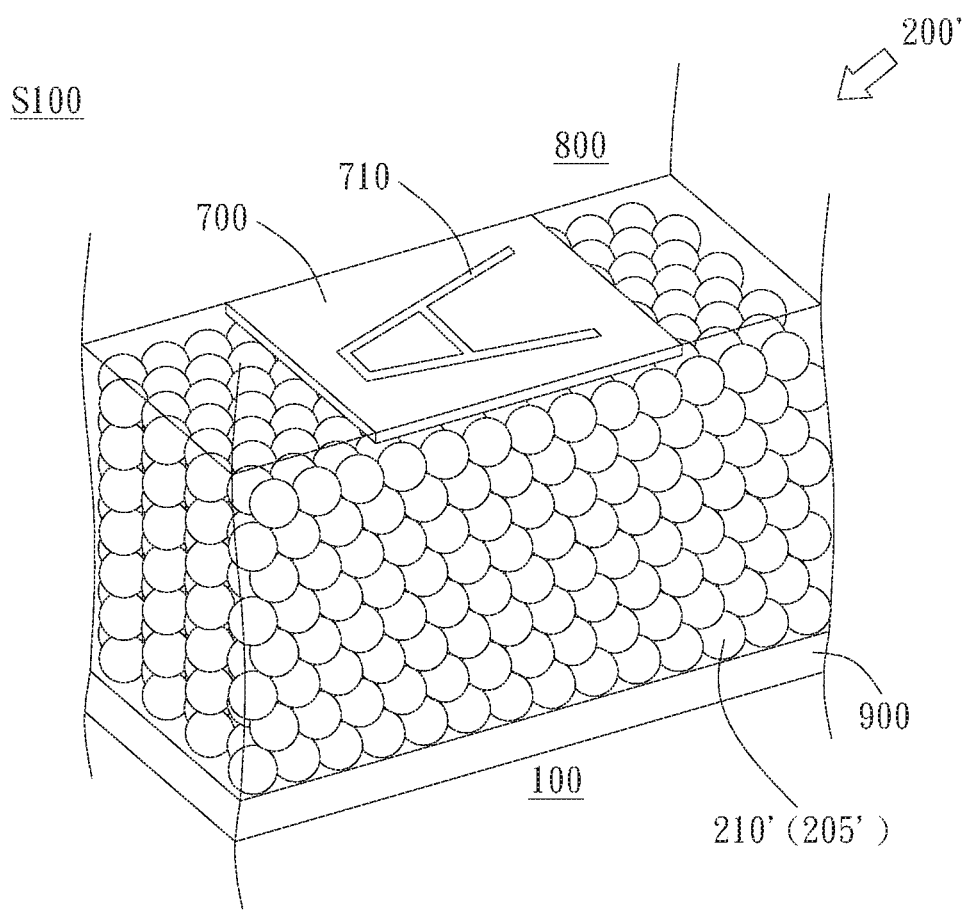
FIG. 17 illustrates a schematic view of setting a foam matrix material including a film-like member according to another embodiment of the invention.

Referring to FIG. 17, in an embodiment different from the embodiments of FIG. 2A-3, in addition to the semi-foamed granules 205' (e.g. the first granules 210'), a film-like member 700 with a pattern 710 can be further disposed between the upper 900 and the shoe last 800 in the setting step S100. Here, for the convenience of explanation, the upper 900, the shoe last 800, and the mold 100 optionally disposed in the FIG. 17 are perspective.

Figure 18:
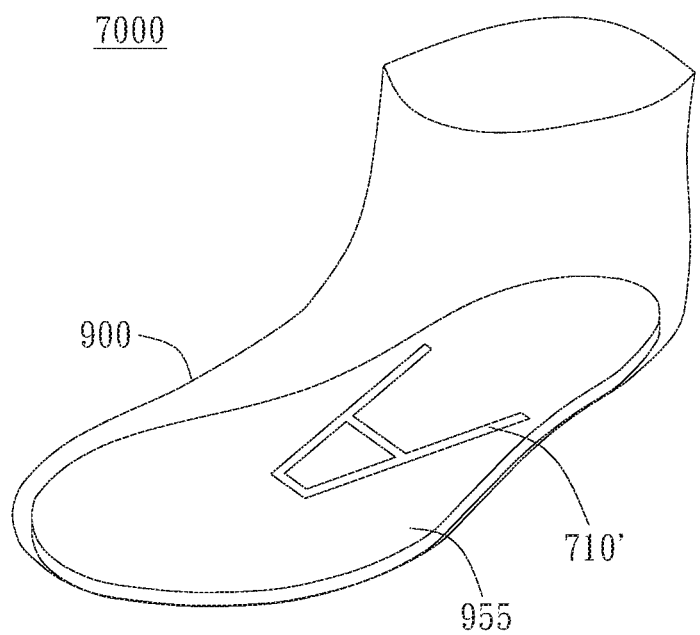
FIG. 18 illustrates a schematic view of a shoe structure formed by foaming the configuration of FIG. 17 through microwave heating.

As described above, referring to FIG. 18, after the foaming step S200, the film-like member 700 itself may be welded to the surfaces of the semi-foamed granules 205' to form an integrally-formed foam molded body 955, which is bonded to the upper 900, and the pattern 710 originally on the film-like member 700 may correspondingly adhere to the foam molded body 955 (it appears as though the pattern 710 is "printed" on the foam molded body 955). That is, the foam molded body 955 formed by foaming has an indication pattern 710' corresponding to the pattern 710. Accordingly, a shoe structure 7000 is formed with the insole (i.e. the foam molded body 955), which has the indication pattern 710' corresponding to the pattern 710 and is bonded to the upper 900. For example, the indication pattern 710' can indicate the size or description of the insole, or can be any decorative pattern.

In an embodiment, the film-like member 700 can be a non-foamed material, or it can be a material having the same or similar properties as thermoplastic polyurethane (TPU). Therefore, the surface of the film-like member 700 will only slightly melt when heated by microwaves, and further form an adhesion with the semi-foamed material (for example, the semi-foamed granules 205') which is foamed and squeezed by microwaves. In this case, since the film-like member 700 is not foamed, it will not be deformed, hence the original position of the pattern 710 will not be changed or affected. Thereby, the indication pattern 710' corresponding to the pattern 710 can be formed after the foaming step S200. Further, in another embodiment, the film-like member 700 may be a non-foamed material and may not be a material with the same or similar properties as the thermoplastic polyurethane (TPU). Therefore, when heated by microwaves, the surface of the film-like member 700 will not melt (e.g. like plastic wrap). In this case, the film-like member 700 and the semi-foamed material (for example, the semi-foamed granules 205') can be coated and positioned by semi-foamed material even though it is not easy to achieve stable attachment when they are squeezed by the foaming caused by microwaving, and the original position of the pattern 710 will not change or be affected. Thereby, the indication pattern 710' corresponding to the pattern 710 can be formed after the foaming step S200. However, the above are merely examples, and the invention is not limited thereto.

In another embodiment, at least one of the film-like members 700 can be a waterproof and moisture permeable film (not shown in the drawings). Specifically, the waterproof and moisture permeable film can assist in discharging the sweat of human body in the form of water vapor, and can assist in isolating the infiltration of external water liquid. For example, the waterproof and moisture permeable film may have a waterproofing capacity for more than 1000-2000 mm, and have a moisture permeability of more than 2000-3000 $g/m^2/24$ hr. However, the above are merely examples, and the waterproof and moisture permeable film can be designed according to the requirements and expectations to have varying degrees of waterproof capability and moisture permeability.

In an embodiment, the waterproof moisture permeable film may include or may be made of materials that can be heated by microwaves, and may include, for example, a material with properties similar to the semi-foamed granules 205'. For example, the waterproof and moisture permeable film may include materials such as polyurethane (PU), thermoplastic polyurethane (TPU) or thermoplastic elastomer (TPE), which do not foam or have negligible foaming capability. As described above, at least part of the foam matrix material 200' (e.g. the semi-foamed granules 205') may be further coated with a waterproof and moisture permeable film before the foaming step S200. Therefore, since the waterproof and moisture permeable film has properties in common with the semi-foamed granules 205', after the foaming step S200, the waterproof and moisture permeable film can have at least part of its surface welded to or coating the foam molded body formed. That is, at least part of the foam molded body may be isolated or coated by a waterproof and moisture permeable film which maintains its original properties or structure, thus improving the waterproof capability and moisture permeability of at least part of the foam molded body and the upper 900 bonded with the foam molded body.

Further, in another embodiment, at least one of the film-like members 700 may include foamable materials that can be foamed by microwave heating. Thereby, it can be used to form various detailed structures or shapes of the foam molded body and the shoe structure including the foam molded body in accordance with the expected design.

Figure 19A:
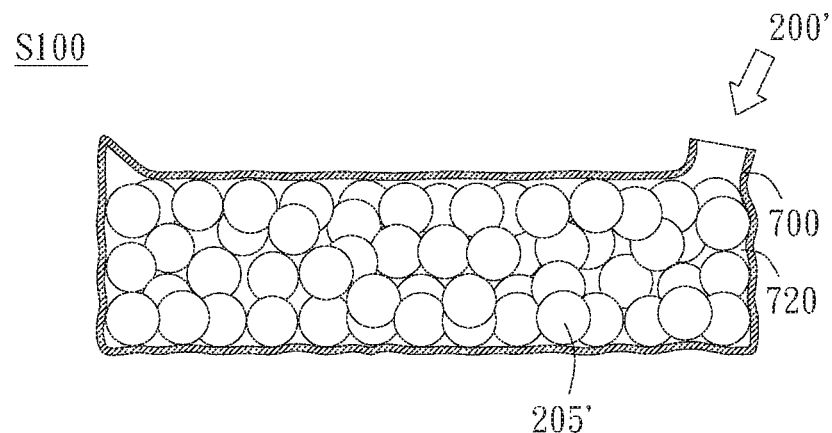
FIGS. 19A-19C illustrate schematic views of setting a foam matrix material including a film-like member and foaming through microwave heating according to another embodiment of the invention.
Figure 19B:
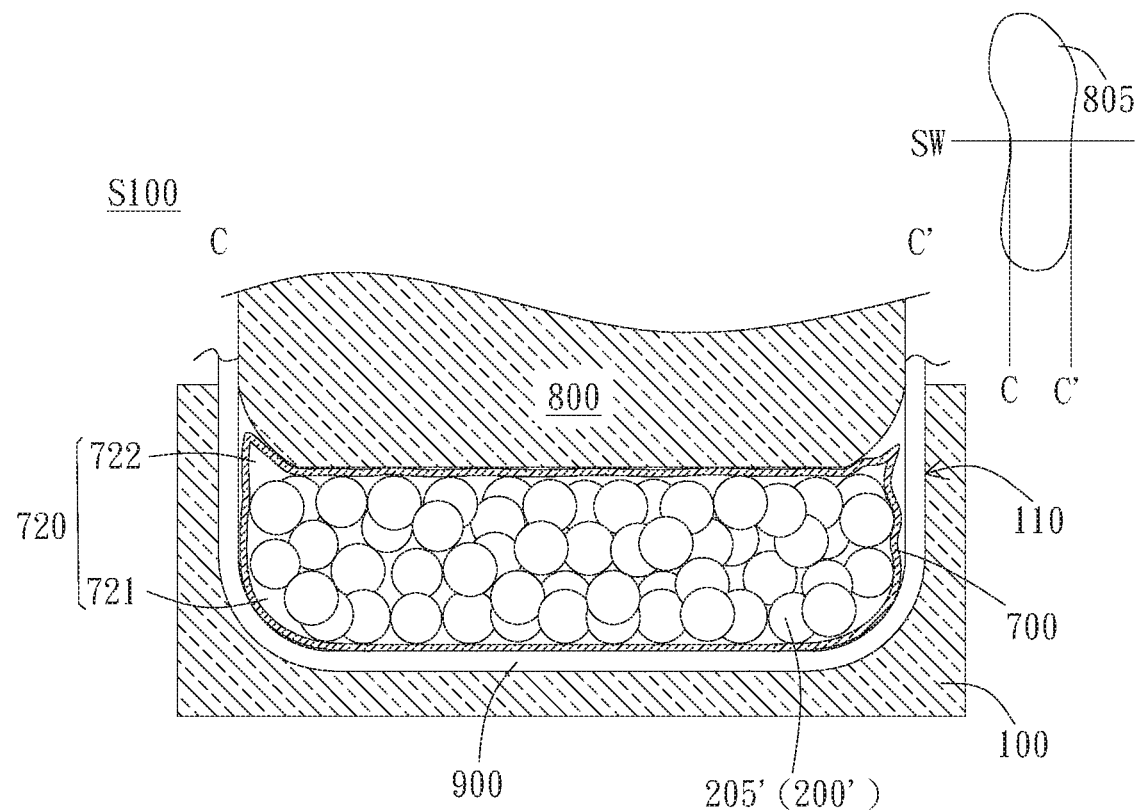
Figure 19C:
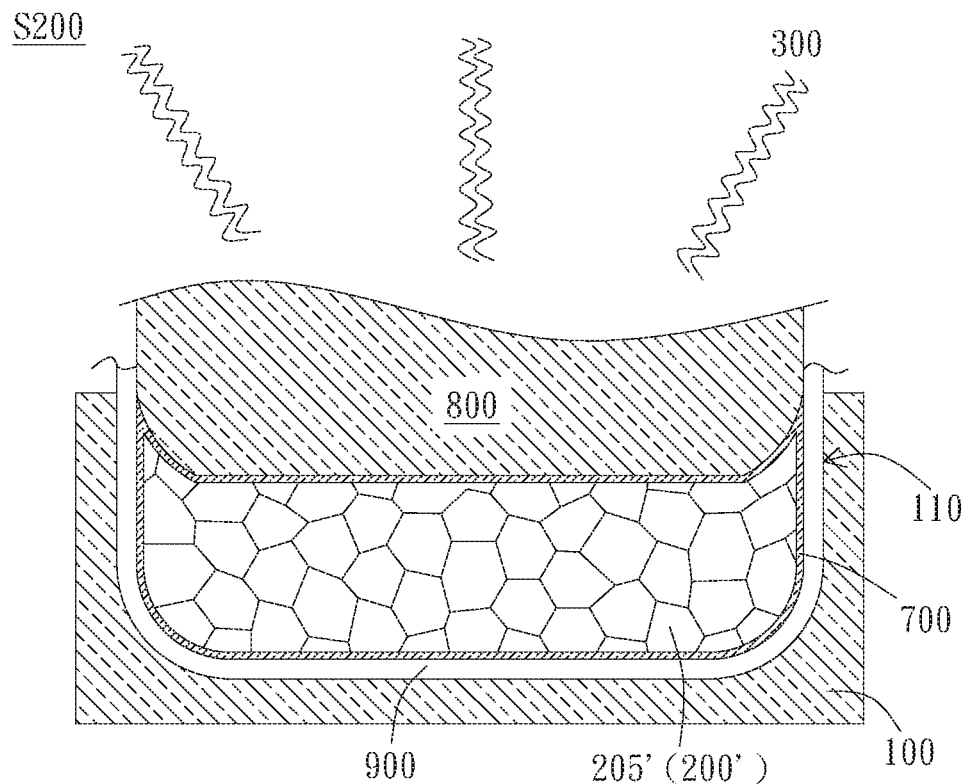

Specifically, with reference to FIG. 19A to FIG. 19C, at least one of the film-like members 700 may include a foamable material, or a material that can be partially melted by microwave heating to be welded to other materials, and may envelop an accommodation space 720. As shown in FIG. 19A, the foam matrix material 200' including the semi-foamed granules 205' can be set in the accommodation space 720 enveloped and delimited by the film-like member 700. Next, as shown in FIG. 10B, the film-like member 700 can be closed and the closed film-like member 700 with foam matrix material 200' inside can be set between the upper 900 and the shoe last 800 to be prepared for foaming. For the convenience of explanation, in FIG. 19B, an enlarged cross-sectional view of the area C-C' between the upper 900 and the shoe last 800 is shown and taken along the shoe width direction SW of the bottom 805. As mentioned above, upon completion of the setting step S100, the accommodation space 720 may include the main space 721 set with semi-foamed granules 205' and an extension space 722 without the semi-foamed granules 205'. The extension space 722 protrudes around the shoe last 800.

Next, referring to FIG. 19C together with FIGS. 19A-19B, when the foaming step S200 is performed using the above-described configurations, the semi-foamed granules 205' are foamed and expanded along the border of the accommodation space 720 delimited by the film-like member 700, and thus a part of the semi-foamed granules 205' that is foaming will expand to fill the extension space 722. Therefore, referring to FIG. 20, after cooling and removing the shoe last 800 (and the mold 100 if exists), the foam molded body 965 includes an extension portion 450, which is formed by foaming the semi-foamed granules 205' to fill the extension space 722 defined by the film-like member 700 around the shoe last 800. That is, the film-like member 700 can be used to define an expected or detailed structure or shape.

Figure 20:
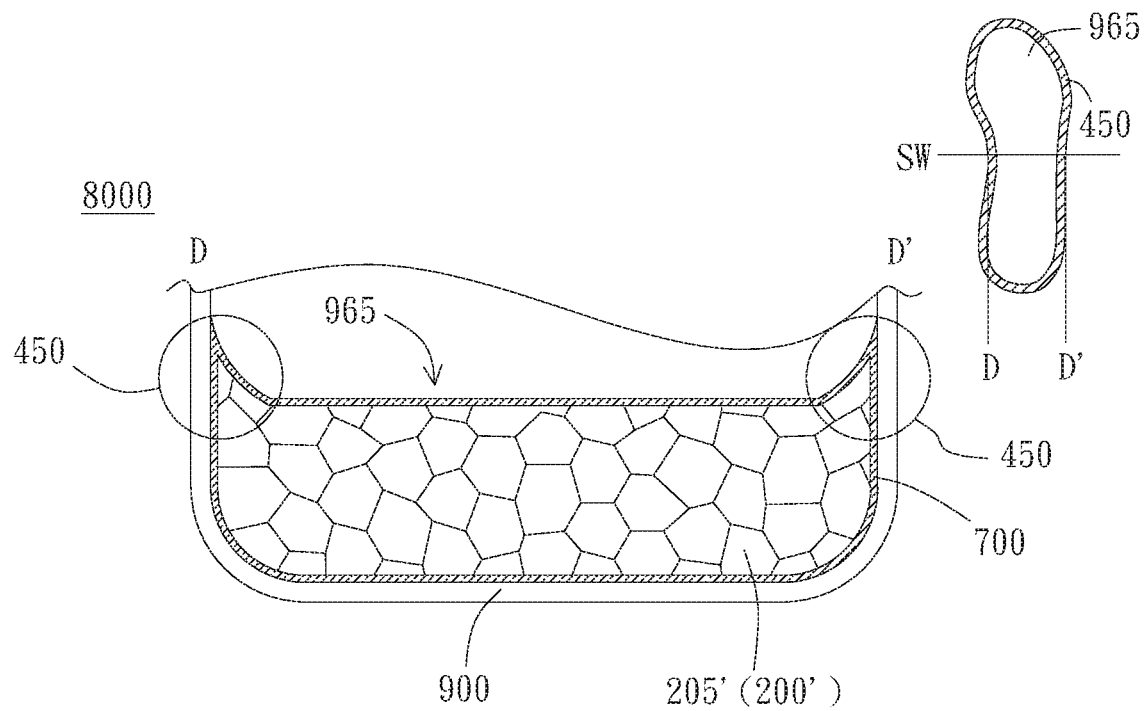
FIG. 20 illustrates a schematic view of a shoe structure manufactured by the method of FIGS. 19A-19C.

Further, as shown in FIG. 20, in the area D-D' of the foam molded body 965 taken along the shoe width direction SW, a slightly convex flange (i.e. the extension part 450) can be formed on both sides of the foam molded body 965 (i.e. the extension part 450). The flanges described above can be used as flanges on both sides of the insole of the shoe structure 8000, thereby enhancing the strength of the attachment of the insole to other portions of the shoe structure 8000 such as the upper 900, or enhancing the protective strength of the shoe structure on both sides of the foot. However, the above is merely an example, and the invention is not limited to the shape of the accommodation space 720 shown here and the shape of the foam molded body 965 formed.

As described above, according to various embodiments of the invention, by using the microwave heating, the foam molded body can be formed and bonded to the upper to form the shoe structure at the same time that the foam molded body is completed. Therefore, the preparation process can be further simplified and the preparation time or cost can be reduced. The microwave heating process performed in accordance with various embodiments of the invention can shorten the process time and save energy, and thus greatly reduce the production cost, compared to the conventional method of injection molding where the matrix material is required to be melted at a high temperature. Further, microwave heating causes the object of heating to be heated up from the inside to the whole in a short time, which is faster and more uniform than the known method of heating from the outside to the inside. With microwave heating, the homogeneity of the final product can be improved, and the microstructures are not easily destroyed and can thus retain better microstructures and corresponding functions. Therefore, the properties and yield of the finished product can be improved, and the microstructures are not easily destroyed and can retain better microstructures and corresponding functions. The performance and yields of the final products can be improved, and the foam molded body and the shoe structure having the foam molded body can have the desired structure, shape, or properties. Thereby, the applicability of foam molded body can be increased.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:

1. A method of manufacturing a shoe structure, comprising:
 a setting step of setting an upper on a shoe last, and distributing a foam matrix material comprising a plurality of semi-foamed granules of thermoplastic polyurethanes (TPU) along a bottom of the shoe last to position the foam matrix material between the shoe last and the upper, wherein the semi-foamed granules are dispersed and in contact with each other across the bottom of the shoe last below the shoe last; and
 a foaming step of heating the shoe last with the upper and the foam matrix material thereon by microwave, so that the semi-foamed granules are foamed to form an insole bonded to the upper, and the upper is shaped along a contour of the shoe last after cooling and removing the shoe last.

2. The method of claim 1, wherein the upper has a dual-layered structure comprising an inner layer and an outer layer, and the foam matrix material is distributed between the inner layer and the outer layer, between the inner layer and the shoe last, or between the inner layer and the outer layer and between the inner layer and the shoe last.

3. The method of claim 1, before the foaming step, further comprising:
 disposing the shoe last with the upper and the foam matrix material thereon in a mold, wherein the mold is not affected by microwave; and
 disposing a plurality of additional semi-foamed granules same as or different from the semi-foamed granules along the bottom of the shoe last in a space defined by a cavity of the mold and the upper.

4. The method of claim 3, wherein the cavity of the mold has a shape of a midsole, and during the foaming step, the additional semi-foamed granules are foamed and squeezed to each other to form a midsole due to temperature risen by microwave.

5. The method of claim 1, wherein:
 the plurality of semi-foamed granules comprises a plurality of first granules sized within a first grain size range and a plurality of second granules sized within a second grain size range; a median of the first grain size range is substantially higher than a median of the second grain size range, and the step of disposing the plurality of semi-foamed granules comprises disposing the plurality of first granules and the plurality of second granules in different regions to form different portions of the insole; and
 in the setting step, the first granules and the second granules are separated by one or more partitions so that they are disposed in different regions.

6. The method of claim 1, further comprising:
 disposing an auxiliary element in the foam matrix material; and
 in the setting step, disposing one or more positioning elements, so that the auxiliary element is positioned by the one or more positioning elements,
 wherein the auxiliary element is not affected by microwave or made of materials not affected by microwave.

7. The method of claim 6, wherein at least one of the one or more positioning elements comprises a semi-foamed material, and in the foaming step, the semi-foamed material and the semi-foamed granules are simultaneously heated and foamed by microwave.

8. The method of claim 1, wherein the setting step further comprises:
 disposing one or more film-like members in contact with the plurality of semi-foamed granules, wherein the one or more film-like members comprise a material that can be heated by microwave.

9. The method of claim 8, wherein at least one of the one or more film-like members is a waterproof and moisture permeable film, and before the foaming step, the method further comprises:
 wrapping at least a portion of the semi-foamed granules by the waterproof and moisture permeable film.

10. The method of claim 8, wherein at least one of the one or more film-like members has a pattern, and the insole has an indication pattern corresponding to the pattern.

11. The method of claim 8, wherein at least one of the one or more film-like members comprises a foamable material or a material treatable by microwave to be melted and welded, and defines an accommodation space; at least a portion of the foam matrix material is disposed in the accommodation space; the accommodation space comprises an extension space in which the semi-foamed granules are not disposed, and the insole comprises an extension part formed by foaming the semi-foamed granules to fill the extension space.

* * * * *